(12) United States Patent
Miller et al.

(10) Patent No.: US 10,615,552 B2
(45) Date of Patent: Apr. 7, 2020

(54) PORTABLE WIRELESS POWER CHARGER WITH MAGNETIC ATTACHMENT SYSTEM

(71) Applicant: Halo2Cloud, LLC, Hartford, CT (US)

(72) Inventors: Garold C. Miller, Hartford, CT (US); Nathan Daniel Weinstein, Hartford, CT (US)

(73) Assignee: Halo International SEZC LTD., Georgetown (KY)

( * ) Notice: Subject to any disclaimer, the term of this patent is extended or adjusted under 35 U.S.C. 154(b) by 0 days.

(21) Appl. No.: 15/802,552

(22) Filed: Nov. 3, 2017

(65) Prior Publication Data
US 2018/0069358 A1 Mar. 8, 2018

Related U.S. Application Data

(63) Continuation-in-part of application No. 15/488,871, filed on Apr. 17, 2017, now Pat. No. 10,418,839.
(60) Provisional application No. 62/322,954, filed on Apr. 15, 2016.

(51) Int. Cl.
| | |
|---|---|
| *H01M 10/46* | (2006.01) |
| *H01R 24/68* | (2011.01) |
| *H02J 7/00* | (2006.01) |
| *H04M 1/02* | (2006.01) |
| *H02J 50/10* | (2016.01) |
| *H02J 7/02* | (2016.01) |
| *H02J 50/90* | (2016.01) |

(52) U.S. Cl.
CPC ............ *H01R 24/68* (2013.01); *H02J 7/0042* (2013.01); *H02J 7/0044* (2013.01); *H02J 7/0045* (2013.01); *H02J 7/0054* (2013.01); *H02J 7/025* (2013.01); *H02J 50/10* (2016.02); *H04M 1/026* (2013.01); *H02J 50/90* (2016.02); *H02J 2007/0062* (2013.01)

(58) Field of Classification Search
CPC .......... H02J 7/0042; H02J 7/355; H02J 7/025; H02J 5/005; H02J 50/90
USPC .................. 320/107, 108, 114, 115; 307/104
See application file for complete search history.

(56) References Cited

U.S. PATENT DOCUMENTS

| | | |
|---|---|---|
| D296,440 S | 6/1988 | Smith et al. |
| D537,036 S | 2/2007 | Chen |
| D587,267 S | 2/2009 | Wang |

(Continued)

*Primary Examiner* — Edward Tso
(74) *Attorney, Agent, or Firm* — Lathrop GPM LLP

(57) ABSTRACT

A portable power charger is provided for wirelessly charging an electronic device from a rechargeable battery internally disposed within the charger. An attachment system is also provided for connecting the electronic device to the portable charger so that the respective wireless transmission components therein are properly aligned for optimal and efficient wireless charging. The alignment system can comprise an arrangement of magnets on each of the portable charger and the electronic device, whereby said magnets are geometrically arrangement is spaced apart relationship to one another. The magnetic arrays on each of the portable charger and the electronic device are complementary to ensure the proper positioning of one relative to the other. The electronic device may alternatively use an attachment ship secured thereto with a magnet array complementing the arrangement on the portable charger, or a protective case with a built in magnetic arrangement at a predetermined location and orientation.

20 Claims, 26 Drawing Sheets

(56) References Cited

U.S. PATENT DOCUMENTS

| | | |
|---|---|---|
| D662,050 S | 6/2012 | Tien |
| D662,878 S | 7/2012 | Fahrendorff et al. |
| D672,309 S | 12/2012 | Tien |
| D674,748 S | 1/2013 | Ferber et al. |
| D677,261 S | 3/2013 | Hsu et al. |
| D686,153 S | 7/2013 | Qu |
| D692,375 S | 10/2013 | Mamane |
| D692,826 S | 11/2013 | Aida et al. |
| D695,214 S | 12/2013 | Roberts et al. |
| D700,139 S | 2/2014 | Chan et al. |
| D704,626 S | 5/2014 | Li |
| D705,782 S | 5/2014 | McParland et al. |
| D709,026 S | 7/2014 | Lee et al. |
| D713,785 S | 9/2014 | Tehrani |
| 9,197,087 B2 | 11/2015 | Lai |
| D749,596 S | 2/2016 | Khodapanah et al. |
| D765,070 S | 8/2016 | Franklin |
| D776,050 S | 1/2017 | Awad et al. |
| D782,974 S | 4/2017 | Ju |
| D789,358 S | 6/2017 | Yang et al. |
| 9,689,527 B2 * | 6/2017 | Franklin ................ F16M 13/02 |
| D791,697 S | 7/2017 | Precheur |
| D792,416 S | 7/2017 | Tsai |
| D804,411 S | 12/2017 | Lentine |
| 2006/0052144 A1 | 3/2006 | Seil et al. |
| 2010/0078536 A1 | 4/2010 | Galvin |
| 2010/0294818 A1 | 11/2010 | LaFargue et al. |
| 2011/0291614 A1 | 12/2011 | Yeh |
| 2013/0026983 A1 | 1/2013 | Yamamoto et al. |
| 2013/0082543 A1 | 4/2013 | Tang |
| 2013/0150134 A1 | 6/2013 | Pliner et al. |
| 2013/0307470 A1 | 11/2013 | Watanabe et al. |
| 2013/0320913 A1 | 12/2013 | Chen |
| 2014/0111159 A1 | 4/2014 | Siminoff et al. |
| 2014/0132206 A1 | 5/2014 | Zhu |
| 2015/0015196 A1 * | 1/2015 | Ormesher ............ H02J 7/0045 320/108 |
| 2016/0003270 A1 * | 1/2016 | Franklin ................ F16B 1/00 439/529 |
| 2016/0072338 A1 * | 3/2016 | Makwinski ........... H02J 7/0054 320/108 |
| 2016/0111692 A1 | 4/2016 | Morita et al. |

\* cited by examiner

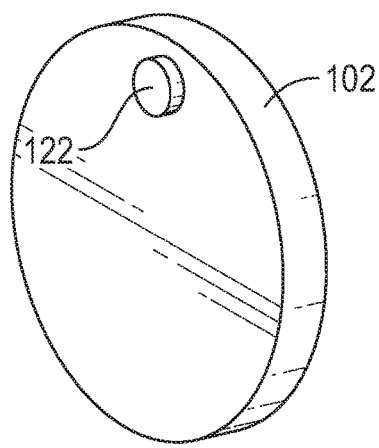
FIG. 20
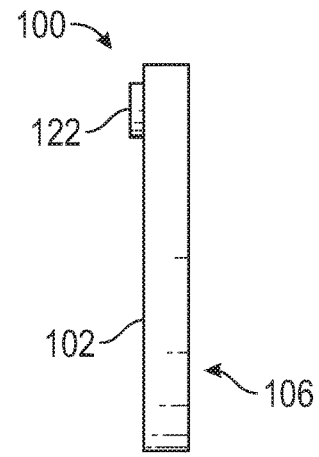
FIG. 20C
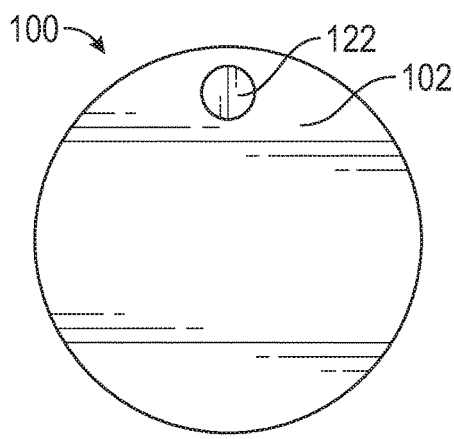
FIG. 20A
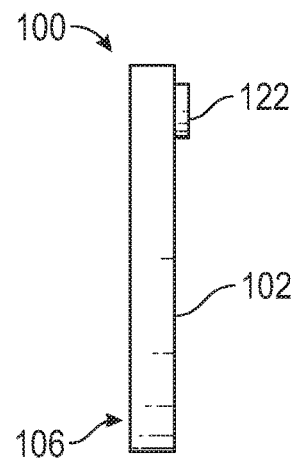
FIG. 20D
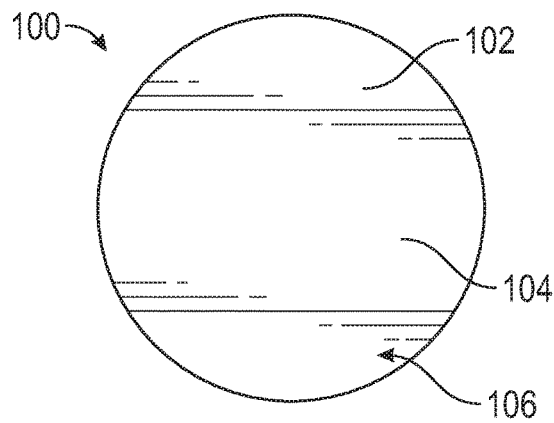
FIG. 20B
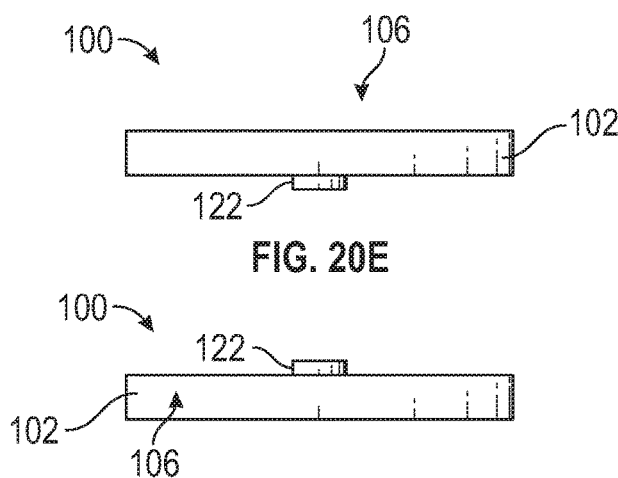
FIG. 20E
FIG. 20F

PORTABLE WIRELESS POWER CHARGER WITH MAGNETIC ATTACHMENT SYSTEM

CROSS-REFERENCE TO RELATED APPLICATION

This application is a continuation-in-part and claims the benefit of U.S. application Ser. No. 15/488,871, filed Apr. 17, 2017, which claims the benefit of U.S. Provisional Application No. 62/322,954, filed Apr. 15, 2016, both of which are incorporated herein by reference in their entireties.

FIELD OF INVENTION

The present invention generally relates to a power charging apparatus, and more particularly relates to a portable power charger and an associated system for attaching said portable power charger to mobile electronic devices for wireless charging.

BACKGROUND OF THE INVENTION

Present day consumers typically own several electronic devices specifically designed for portability and on-the-go use, including, for example, a mobile phone or smart phone, a portable music player like an iPod® or an MP3 player, a tablet, a portable gaming unit, a camera, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is often difficult to charge multiple devices at the same time, especially where each device requires a separate charging cable. For example, a car charger port may only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, connection interface attachments are also available for adapting a charging cable for use with a variety of devices for recharging from a power source, each requiring a different interface connection. However, such attachments are usually separate small pieces, and therefore difficult to keep track of when not in use. Further, use of such attachments does not solve the problem presented by the need to charge multiple devices at the same time, from the same power source, as oftentimes, only one attachment can be used with a charging cable at a time.

Portable power chargers exist that permit recharging of electronic devices when a standard power source is not readily available. For example, portable power chargers are illustrated and described in co-pending U.S. application Ser. No. 13/682,985, filed Nov. 21, 2012, which shares common inventors with the present application and which is incorporated herein by reference. Some existing power charger devices usually cannot charge multiple devices at the same time, either due to limited capacity or connectivity options. Even if multiple devices may be attached to the power charger at the same time, the charger may prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can then be recharged.

In addition, portable power chargers generally remain separate from and unattached to electronic devices when the portable power chargers are not in use and are only connected to electronic devices via cables and adapters when recharging the electronic devices. This means that the portable power charger must be carried separately from and in addition to the electronic device when not in use so that it is available when needed to charge the electronic device. Even when the portable power charger is connected to an electronic device via cable and/or adapter for charging, carrying both the portable power charger and the electronic device in one's hands simultaneously is awkward and unwieldy, and the charging cable can be easily disconnected from the charger and/or the device.

Wireless power chargers have been introduced to the market, especially for mobile electronic devices, that have provided additional approaches to recharging portable electronic devices. Such wireless power transmission devices have been developed in connection with wireless charging standardization efforts, including by the Wireless Power Consortium (WPC), which have led to the adoption of devices that permit recharging of electronic devices without the use of separate chargers for each device. More particularly, the WPC has introduced the Qi wireless charging standard. Qi, which translates to "vital energy," takes its name from the Chinese concept of intangible flow of power and utilizes magnetic coil induction to transmit a charge from a transmitter to a receiver via a magnetic field.

Commonly, a wireless power transmission device utilizing magnetic coil induction includes a charging mat that must be connected to an external power source, such as a wall socket or a car charger socket, in order to transmit power wirelessly. The charging mat includes a transmitter having an induction coil. When a current is passed through the transmitter coil, a magnetic field is generated and transmitted to an electronic device placed on the charging mat. Such a device, in order to be wirelessly charged via the charging mat, must include a receiver having an induction coil, typically connected to the internal battery of the electronic device. When the electronic device is placed on an energized charging mat in a particular location, the receiver receives the wirelessly transmitted power in the form of a magnetic field, which induces a voltage in the receiver coil that can be used to power the electronic device or charge the internal battery of such a device.

Various drawbacks of prior art wireless power chargers have been identified. For example, such wireless chargers are not easily portable and require direct connection to an external power source for operation. Such external power sources are often not readily available, which makes the charger useless for on-the-go use. Additionally, some charging mat designs are often too small to be able to charge more than one electronic device at the same time. As noted, some wireless charging mats require a device to be placed in a particular spot—e.g., a Qi spot—where the transmitter and receiver coils must be properly aligned in order for a charge to be transmitted. If the devices are not properly aligned, there may be no charging. Accordingly, a drawback of prior art wireless charging devices is that it is difficult to ensure that the devices are properly aligned in order to ensure charging activity.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations. Additionally, there is a need for such a charger that is portable, has a compact size, is attachable to an electronic device for easy carry and use with the electronic device, and further is easy to use in various conditions and locations to charge one or more electronic devices simultaneously, including but not limited to in a house or office, a car or an airplane, as well as on-the-go, without compromising operation and performance. Further, there is a need for a portable charger that is easily attachable to and detachable from an electronic device allowing for convenient and hands free charge and carry. Still further, there is a need for an attachment system for such a portable charger that can ensure proper alignment between the charger and an electronic device in need of a recharge in order for the electronic device to be wireless recharged from the portable charger. Still further, there is a need for a portable charger that can be recharged from an external power source or from a wireless power transmission device, providing increase flexibility and convenience of use for the portable charger. Still further, there is a need for a portable charger that can recharge its internal battery from an external power source or a wireless charging device at the same time as an electronic device connected to the charger, either directly or wirelessly, is being recharged by or via the charger unit. Still further, there is a need for a portable charger unit in a compact size that has increased functionality for a user requiring a portable source of power without compromising its ability to successfully and consistency connect to and wirelessly charge electronic devices. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable power charger is provided for charging one or more portable electronic devices. In general, a portable power charger includes a charger housing having a rechargeable battery unit disposed therein for connecting to and recharging one or more electronic devices, as necessary, and may also include wireless power transmission components, such as a transmitter and a receiver, for recharging the charger as well as electronic devices via wireless power transmission methods.

The portable power charger may also include at least one power connection port for connecting the portable power charger with an external power source, or at least one electronic device, or both. Similarly, the portable power charger may also include at least one connector cable interface for connecting the portable power charger with an external power source, or at least one electronic device, or both.

In embodiments of the present invention, the portable power charger can include a wireless transmitter operatively connected to the internal rechargeable battery for transmitting a power charge to an electronic device having a wireless receiver. The portable power charger may further include a wireless receiver operatively connected to the internal battery for receiving a power charge from a power source having a wireless transmitter. In embodiments of the portable power charger including both a wireless transmitter and a wireless receiver, the portable power charger can both be charged wirelessly, for example, when placed on a wireless power transmission device (e.g., wireless charging mat), and charge other devices wirelessly, for example, when a device is placed on the charger housing.

In addition, in accordance with an aspect of the present invention, the portable power charger includes an attachment system for attaching the portable power charger to an electronic device so that the portable power charger and the electronic device can be properly aligned for wireless transmission. Additionally, the attachment of the portable power charger directly to the electronic device permits the charger and electronic device to be carried by the user as one unit, while also facilitating and improving the charging of the electronic device, either by wireless charging, or by direct charging connection, in accordance with embodiments of the present invention. Still further, the attachment system ensures proper alignment of the electronic device with the portable power charger for wireless Qi charging, and also maintains such alignment during the charging process—for example, a transmitter induction coil in the charger is aligned with a receiver induction coil in the electronic device to ensure proper and efficient wireless connection therebetween.

In an embodiment of the present invention, the portable power charger is attachable to an electronic device via an attachment system comprising one or more magnets disposed on the surface or within the charger housing that interacts with a complementary arrangement of one or more magnets or metal pieces provided on the surface of or in an electronic device, allowing for hands free carry and charge. The magnet(s) allows the portable power charger to remain connected to the electronic device while charging but also allows for seamless removal when the charge is completed by pulling the portable power charger apart from the electronic device. Not only do the magnets work to connect the electronic device to the portable charger, but in accordance with the present invention, the magnets work to position and ensure proper alignment of the respective charging components in the charger and the electronic device.

In accordance with preferred embodiments of the present invention, the attachment system comprises a plurality of magnets geometrically arranged in spaced apart relationship to one another on or near the surface of the portable charger and positioned around the wireless transmission area of the charger so as not to interfere with the wireless transmissions from the transmitter. In one embodiment, an electronic device is provided with an array of magnets geometrically arranged in spaced apart relationship to one another on or near the surface of the electronic device and positioned around the wireless receiving area of the electronic device so as not to interfere with the wireless transmissions directed to the wireless receiver, wherein the geometric arrangement of magnets on the electronic device is complementary to the geometric arrangement of magnets on the charger to ensure proper alignment between the wireless transmitter of the portable charger and the wireless received of the electronic device. In an alternate embodiment, a separate attachment chip is provided that can be attached to an electronic device, whereby the chip includes an array of magnets geometrically arranged in spaced apart relationship to one another such that the array of magnets will be positioned around the wireless receiving area of the electronic device when the chip is connected to said device, wherein the geometric arrangement of magnets on the attachment chip is complementary to the geometric arrangement of magnets on the charger. In another embodiment, the geometric arrangement of magnets for the electronic device can be provided in a case adapted for the electronic device that will place the arrangement in a predetermined location relative to the wireless receiver of said device.

In alternate embodiments, the array on the electronic device or the attachment chip can be pieces of metal that magnetically engage the magnets of the power charger to align the electronic device with the portable charger for wireless charging.

In accordance with embodiments of the present invention, the portable power charger comprises a charger housing with a rechargeable internal battery disposed therein. The internal battery is operatively connected with the wireless transmitter and receiver for charging other electronic devices from the internal battery via the wireless transmitter or for relaying an electrical charge from an external power source for recharging the internal battery when the portable power charger is connected to the power source via the wireless receiver. The charger unit is portable as a result of the small size of the housing. Despite the small size of the unit, the power capacity is very high so that the charger can accommodate multiple electronic devices at the same time.

Additionally, the portable power charger may include one or more power connection interface for directly connecting the portable charger with an external power source, or at least one electronic device, or both.

In embodiments of the present invention, the one or more power connection interface can comprise a female connection port adapted for receiving a complementary male connection interface of a standard charging cable, which connects at an opposite end to a portable electronic device. In other embodiments, the power connection interface can comprise a female swivel USB port increasing its connectivity, for example, when the charger is attached to one electronic device, but needs to connect to a second electronic device via the port. In other embodiments, the power connection interface can comprise an adjustable cartridge such as a slide-and-pivot USB port which can be used as a female connection port adapted for receiving a complementary male connection interface of a standard charging cable or alternatively, as a male slide-and-pivot USB interface adapted for connecting into a female port of an electronic device. In other embodiments, the power connection interface can include a charging cable attached to the charger housing and preferably stored within a storage cavity in the charger housing when not in use. In preferred embodiments of the present invention, the portable power charger includes both wireless charging capabilities, and direct charging connectivity.

In additional embodiments the portable power charger of the present invention can be used to charge multiple electronic devices simultaneously, both via direct connection and wirelessly, as disclosed, for example in U.S. Pat. No. 9,318,915, which shares common inventors with the present invention, and which is incorporated herein by reference.

In various embodiments of the present invention, the portable power charger may further comprise a controller or processing unit, which can control wireless and direct connectivity with the portable power charger, keep track of the capacity level of the rechargeable battery, store data or provide a conduit means by which data can be exchanged between electronic devices, such as between a smart phone and a computer.

In various embodiments of the present invention, the charger unit may include a flashlight feature located on the surface of the housing unit to improve on the functionality of the charger.

These and other objects, features and advantages of the present invention will become apparent in light of the detailed description of embodiments thereof, as illustrated in the accompanying drawings.

BRIEF DESCRIPTION OF THE DRAWINGS

FIG. 20 illustrates a perspective view of an embodiment of an eleventh attachment chip in accordance with the present invention.

FIGS. 20A-20F illustrate planar front, back, right side, left side, top and bottom views of the attachment chip of FIG. 20.

DETAILED DESCRIPTION OF THE DRAWINGS

Figure 2:
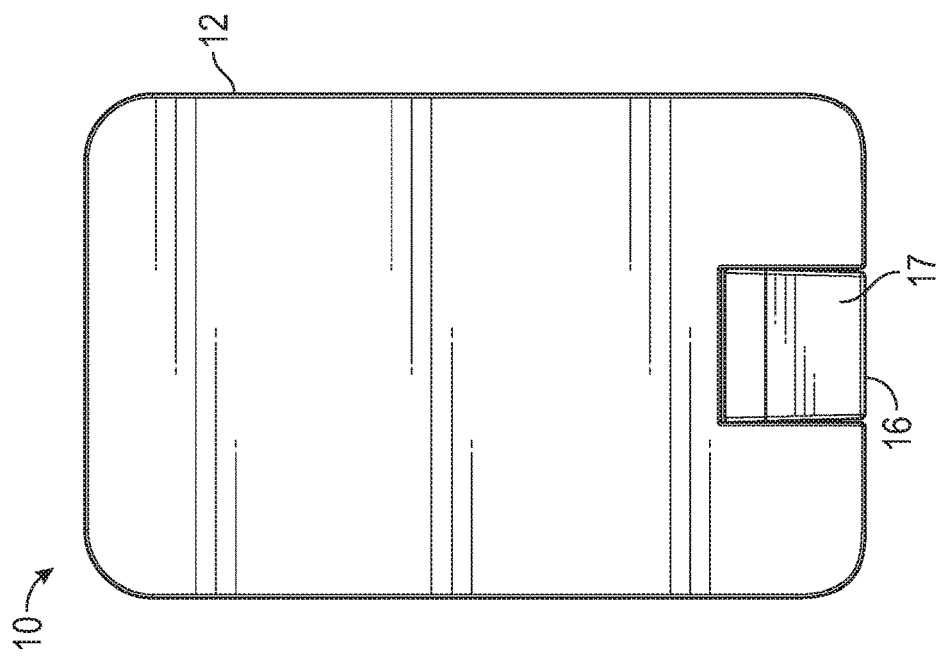
FIG. 2 shows a planar front view of the portable power charger of FIG. 1.

A portable power charger in accordance with an embodiment of the present invention is illustrated in FIGS. 1-5, and generally designated as reference numeral 10. The portable power charger 10 generally includes a charger housing 12 having a rechargeable battery unit 14 internally disposed therein. The rechargeable battery unit 14 is generally illustrated in FIG. 6. The power charger 10 is designed for portability and convenient on-the-go use to recharge one or more mobile electronic devices and is designed to be attachable to an electronic device via an attachment system allowing for hands free carry and charge, while also allowing for easy detachment from the electronic device, once attached and as needed. The portable power charger 10 is also designed for easy and flexible recharging of the internal battery 14 from a variety of power sources so that it can be easily charged up to have sufficient battery capacity when it is needed to recharge a portable electronic device.

Preferably, the rechargeable battery unit 14 of the portable power charger 10 is capable of being recharged in a variety of manners, including via direct connection and via wireless connection. For example, to charge the battery unit 14, the charger 10 may be connected with an external power source via a power input connector cable interface provided with the charger 10, via direct connection with an external power source via a separate connector cable that engages a power connection port interface provided on the charger housing 12, or via wireless power transmission means. A portable power charger 10 in accordance with the present invention can include any or all of these recharging features in various combinations without departing from the principles and spirit of the present invention.

Similarly, the portable power charger 10 can be used to recharge one or more electronic device in a variety of manners, including via direct connection and via wireless connection. For example, to use the portable charger 10 to recharge an electronic device, the charger 10 may be connected with an electronic device via a power output connector cable interface provided with the charger 10, via direct connection with an electronic device via a separate connector cable that engages a power connection port interface provided on the charger housing 12, or via wireless power transmission means. A portable power charger 10 in accordance with the present invention can include any or all of these recharging features in various combinations without departing from the principles and spirit of the present invention.

Referring to the embodiment illustrated in FIGS. 1-5, the portable power charger 10 of the present invention has the capability of charging other devices or being recharged itself via wireless transmissions, or via direct connections, either using connector cables provided with and stored in the charger housing 12, or via separate connector cables attachable to the charger 10 via power connection ports provided on the charger housing 12. In this regard, the portable charger 10 can be used on-the-go to charge one or more electronic devices by various means and combination of means.

Figure 3:
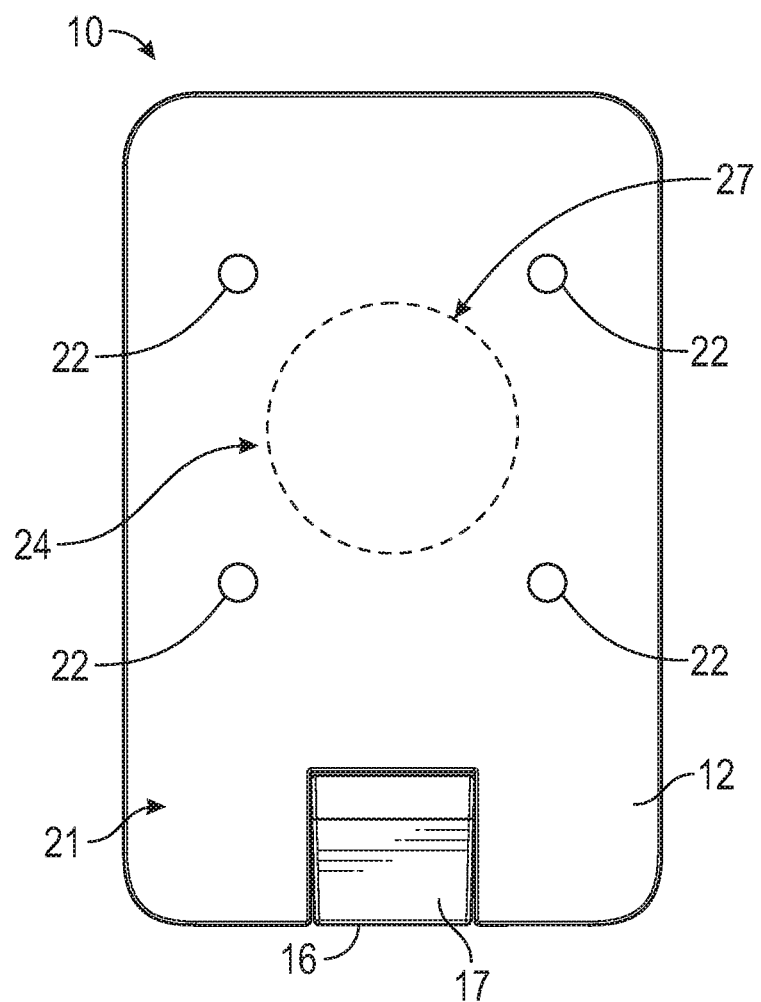
FIG. 3 shows a planar back view of the portable power charger of FIG. 1.

Referring to FIG. 3, the portable power charger 10 includes an attachment system on or disposed within and near a first outer surface 21 of the charger housing 12 comprised of an arrangement of one or more magnets 22 that interact with magnets or metallic pieces 222 provided on or within the surface of an electronic device, generally designated herein by reference numeral 200. When the respective magnets 22 and 222 are aligned, the electronic device 200 is attached to the portable charger 10 for wireless charging of the electronic device 200, while also allowing for hands free carry and charge.

In an embodiment of the present invention, said attachment system comprises one or more magnets 22 geometrically arranged on or within the first surface 21 of the charger housing 12 in spaced apart relationship to one another. An electronic device 200 is provided with a complementary geometric arrangement of magnets 222 in spaced apart relationship to one another, whereby interaction of the respective geometric arrangements on the portable charger 10 and the electronic device 200 ensure proper alignment of the charger 10 with the electronic device 200 for efficient wireless charging. Use of the attachment system also allows the portable power charger 10 to remain connected to the electronic device 200 while charging but also allows for seamless removal when the charge is completed. Using the illustrated magnetic array on the portable charger 10, the power charger 10 can be attached to a variety of electronic devices and ensure proper alignment for wireless charging regardless of the size and shape of the electronic device, so long as the geometric array of magnets on said devices is properly positioned relative to the appropriate wireless transmission components.

The magnetic array 22 on the portable charger 10 could be one, two or even more magnets. More preferably, the attachment system utilizes at least three magnets in a geometric arrangement relative to one another. Even more preferably, the attachment system utilizes four magnets in a geometric arrangement in spaced apart relationship relative to one another. Referring to FIG. 3, an embodiment of the portable charger 10 with four magnets 22 generally arranged to define a square is illustrated. Preferably, the arrangement of magnets 22 is positioned around and defines an opening 24 generally corresponding to the transmitter induction coil 26 used in the charger 10 for wireless transmission of power to an electronic device 200. Referring to FIG. 3, the four magnets 22 are illustrated as being around the circular transmission area generally aligned with the transmitter induction coil 26 disposed within the charger housing 12, generally designated by reference numeral 27. In this regard, the positioning and location of the magnets 22 does not interfere with wireless transmission from the charger 10 or degrade the transmitted charge, while also ensuring that the electronic device 200 in need of a recharge is properly aligned with the transmission area 27 of the charger 10 for optimal and efficient recharging.

Figure 7:
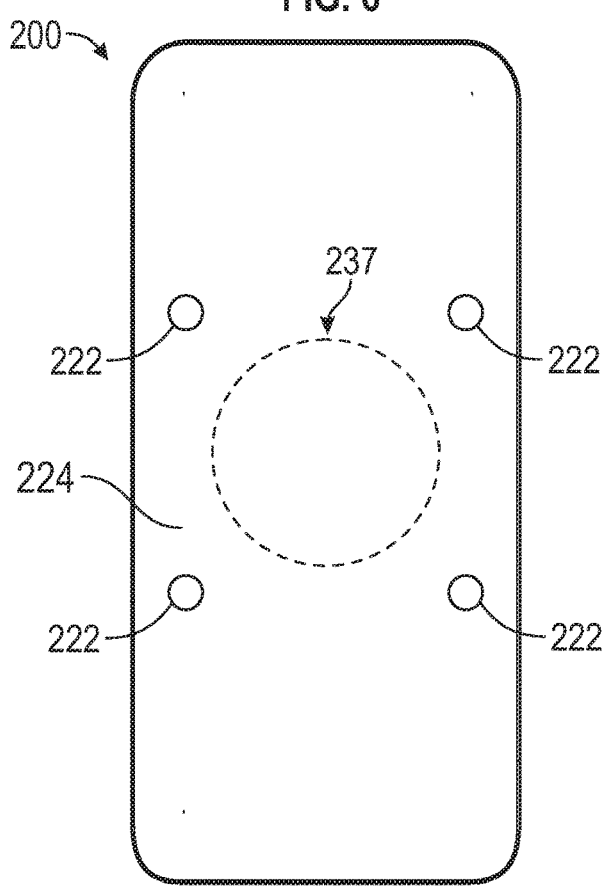
FIG. 7 shows a planar view of a portable electronic device that can be wirelessly recharged by attachment to the portable power charger of FIG. 1.
Figure 8A:
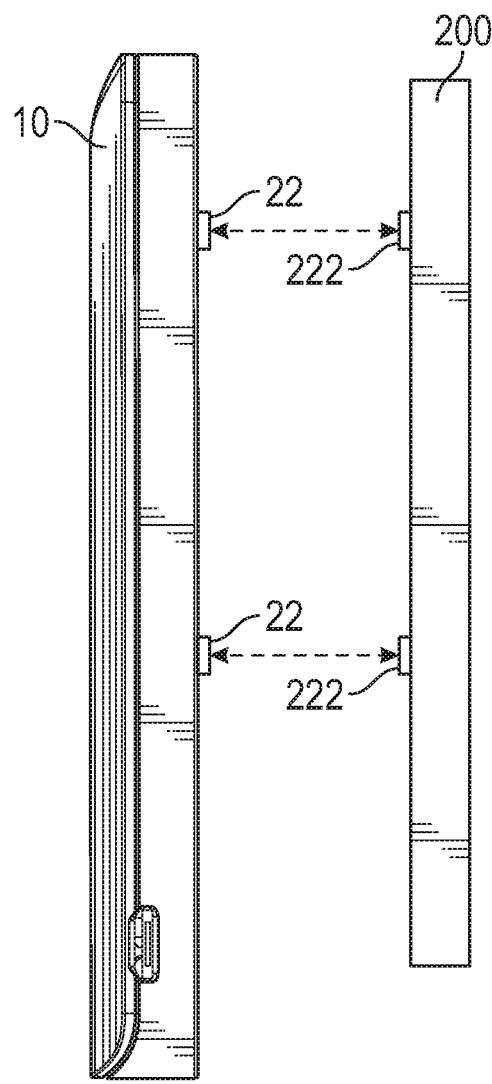
FIGS. 8A and 8B illustrate attachment of the portable electronic device of FIG. 7 to the portable power charger of FIG. 1 in accordance with an embodiment of the attachment system of the present invention.

In another aspect of the present invention, an electronic device 200 that can be wirelessly charged from the portable charger 10 is provided with one, two or even more magnets 222 in an arrangement that generally complements the number, location and orientation of magnets 22 on the portable charger 10. For example, an electronic device 200 to be used with the portable charger 10 shown in FIG. 1, would have four magnets 222 geometrically arranged to define a square with the same spacing and size as on the portable charger 10. An exemplary electronic device 200 is illustrated in FIG. 7. As so designed, the magnet arrays 22 and 222 will interact with each other to connect the electronic device 200 to the portable charger 10. As with the magnetic array 22 on the charger 10, the magnetic array 222 on the electronic device 200 is preferably positioned around and defines an opening 224 generally corresponding to the receiver induction coil (not shown) used in the device 200 for receiving a wireless transmission of power from a power source (i.e., the portable charger 10) generally represented by reception area 237 depicted in FIG. 7. Thus, when the respective magnetic arrays 22 and 222 are connected, as represented in FIG. 8, the electronic device 200 is properly aligned with the portable charger 10 so that the receiver in the former is aligned with the transmitter 26 in the latter. Additionally, the magnets 22 and 222 maintain their connection so that there is reduced risk of the electronic device 200 shifting, moving or even coming disconnected during charging.

Figure 9A:
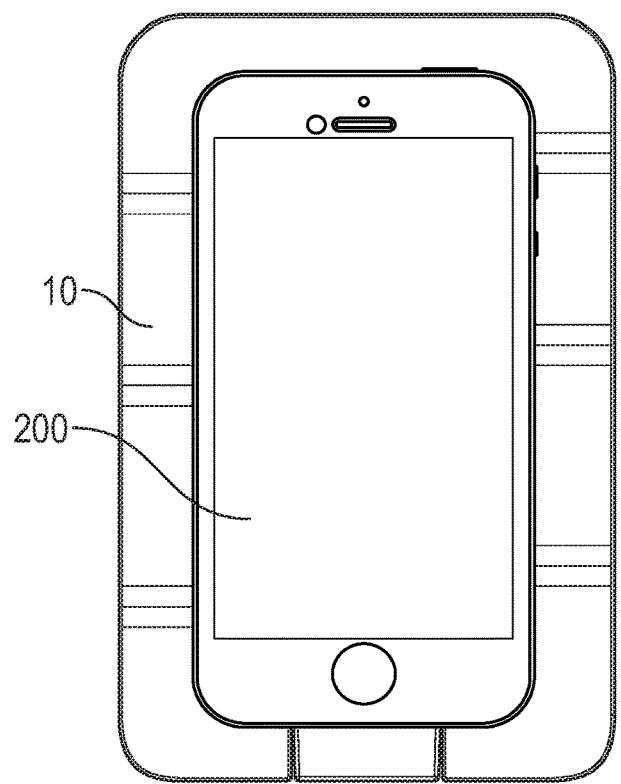
FIGS. 9A and 9B illustrate attachment orientations of the portable electronic device of FIG. 7 relative to the portable power charger of FIG. 1.
Figure 9B:
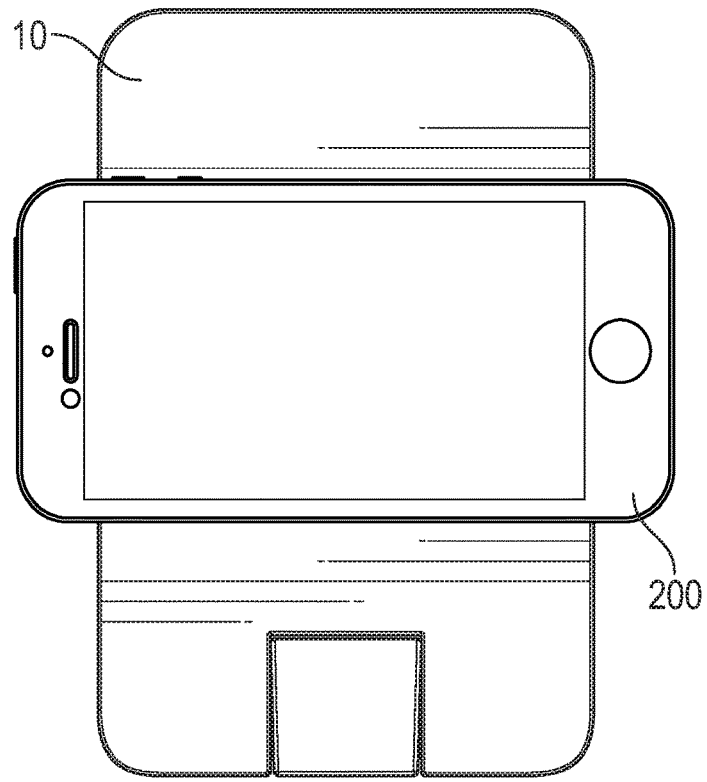

By using a square arrangement for the magnets 22 on the charger 10, and further by arranging the magnets 22 around the transmission area 27 of the charger 10, any electronic device 200 having a complementary arrangement of magnets 222 can be connected to the portable charger 10 in either of two directions but still be ensured of having the critical wireless transmission components aligned (as illustrated in FIGS. 9A and 9B). Moreover, electronic devices of any size or shape can be perfectly aligned with the portable charger 10 merely by including a magnetic array matching the geometric arrangement on the portable charger 10. Alternate numbers and arrangements of magnets can be used without departing from the principles and spirit of the present invention. Using three or more magnets in a spaced apart geometric arrangement will ensure consistent and desired X and Y alignment between the portable charger 10 and the electronic device 200.

Figure 10:
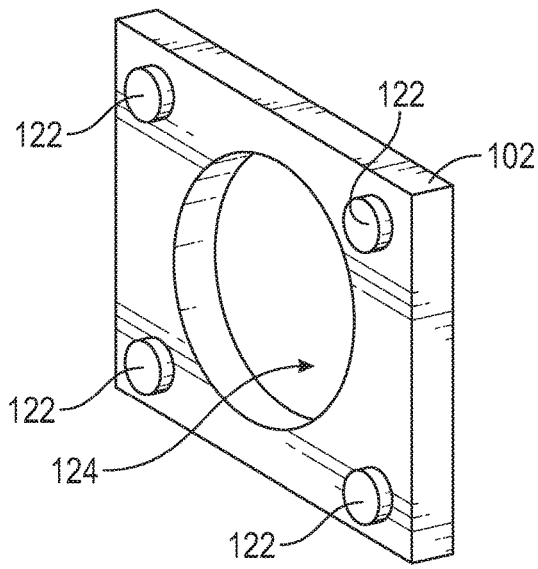
FIG. 10 illustrates a perspective view of a first embodiment of an attachment chip in accordance with the present invention.
Figure 10C:
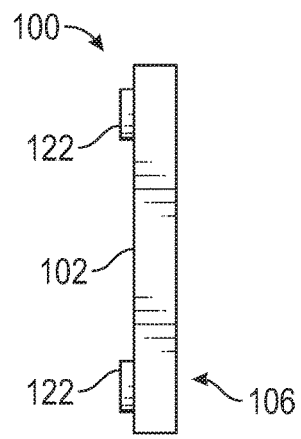
FIGS. 10A-10F illustrate planar front, back, right side, left side, top and bottom views of the attachment chip of FIG. 10.
Figure 10A:
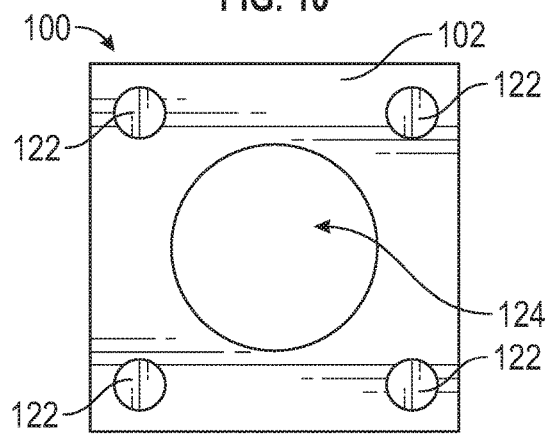
Figure 10D:
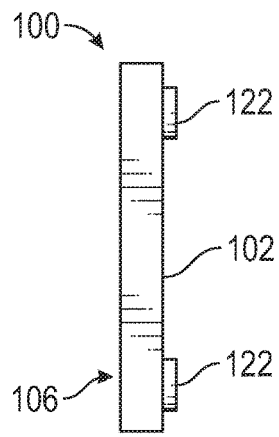
Figure 10B:
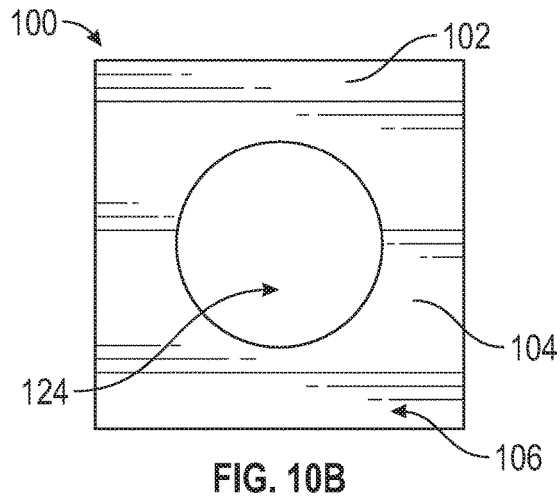
Figure 10E:
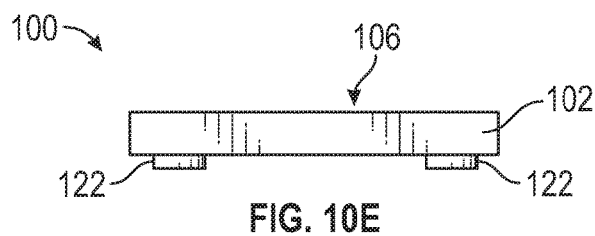
Figure 10F:
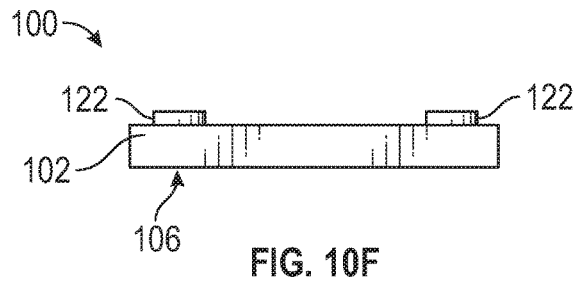
Figure 11:
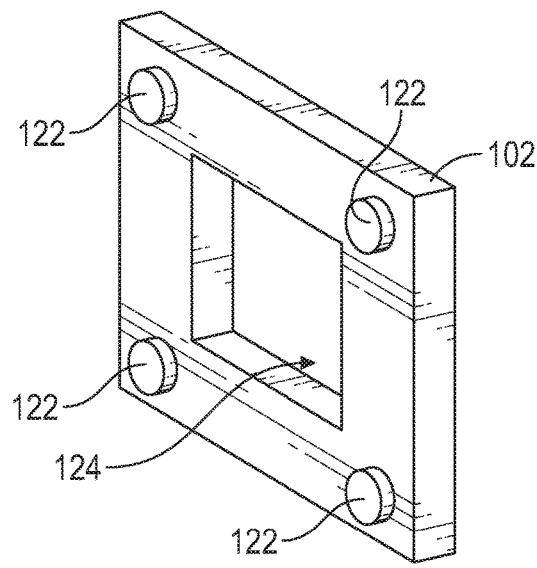
FIG. 11 illustrates a perspective view of a second embodiment of an attachment chip in accordance with the present invention.
Figure 11A:
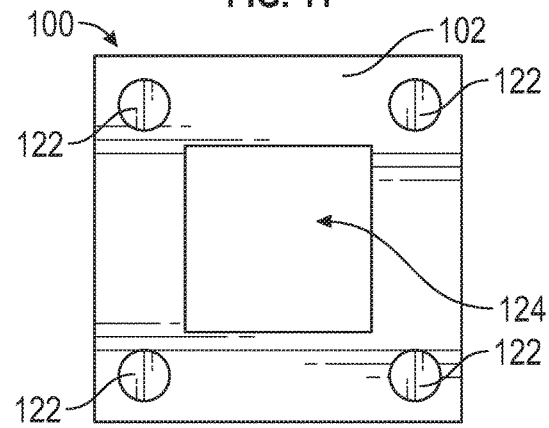
FIGS. 11A-11F illustrate planar front, back, right side, left side, top and bottom views of the attachment chip of FIG. 11.
Figure 11B:
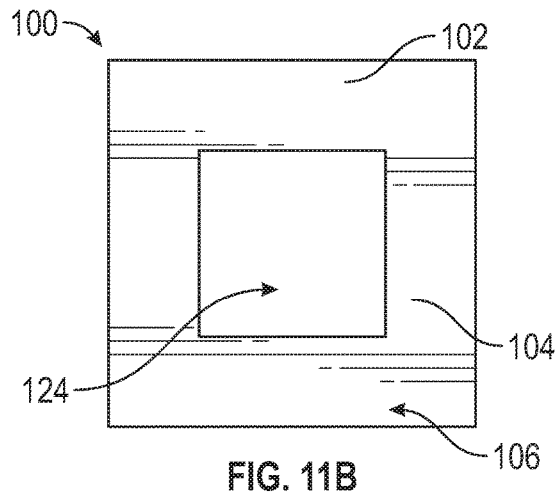
Figure 11C:
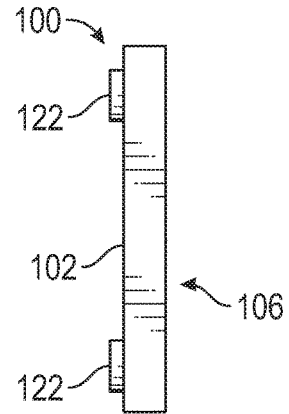
Figure 11D:
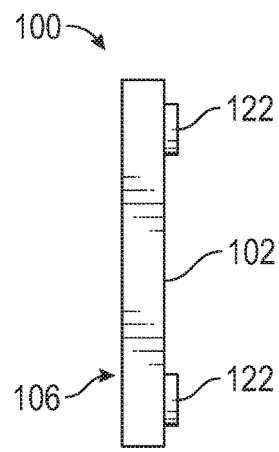
Figure 11E:
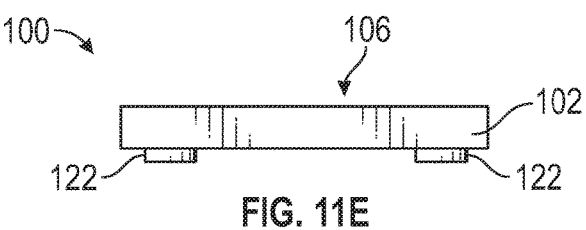
Figure 11F:
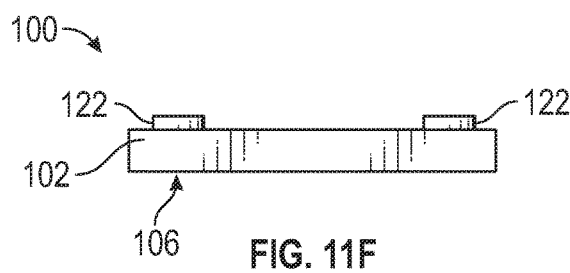
Figure 12:
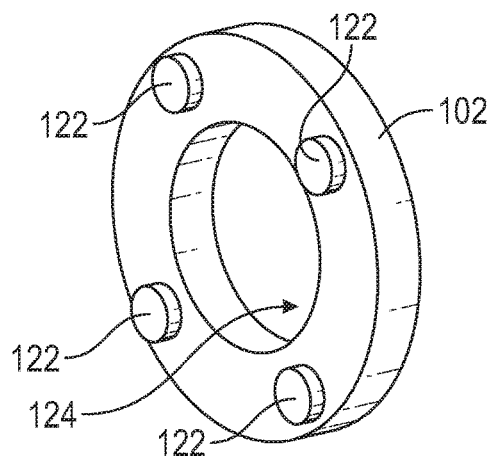
FIG. 12 illustrates a perspective view of a third embodiment of an attachment chip in accordance with the present invention.
Figure 12A:
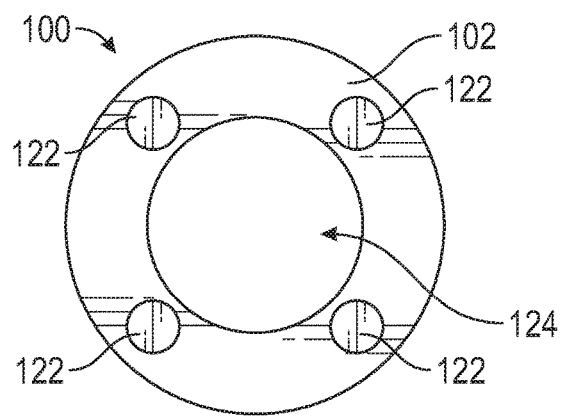
FIGS. 12A-12F illustrate planar front, back, right side, left side, top and bottom views of the attachment chip of FIG. 12.
Figure 12B:
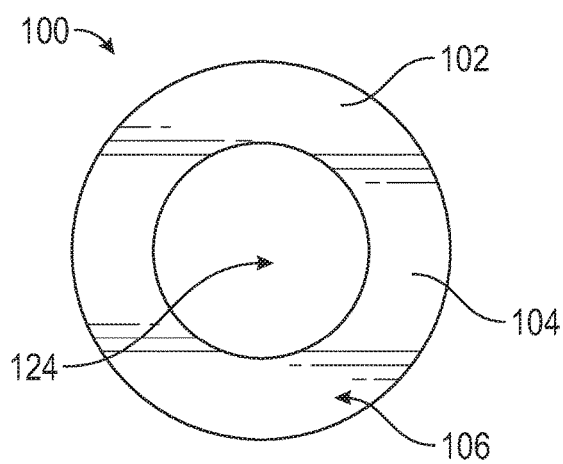
Figure 12C:
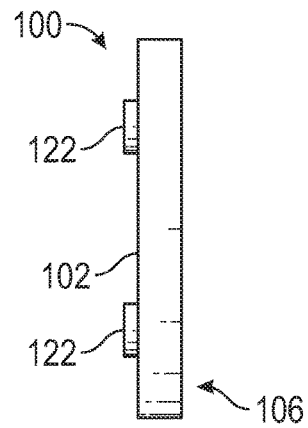
Figure 12D:
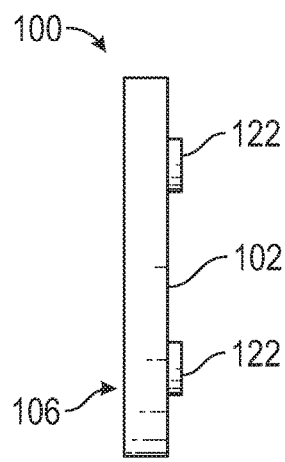
Figure 12E:
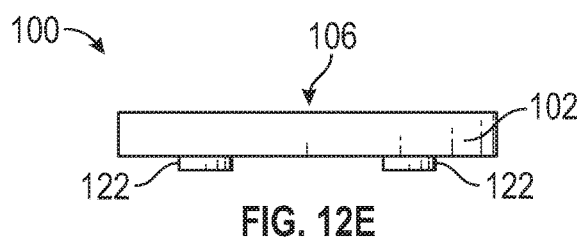
Figure 12F:
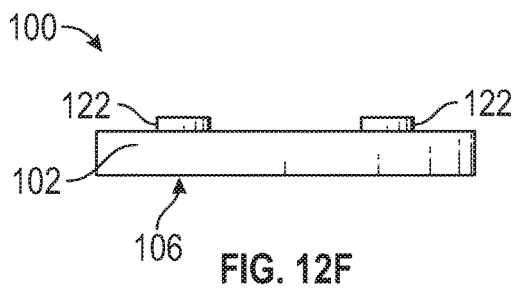
Figure 13:
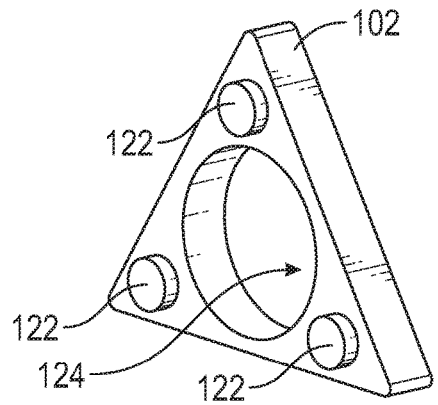
FIG. 13 illustrates a perspective view of a fourth embodiment of an attachment chip in accordance with the present invention.
Figure 13A:
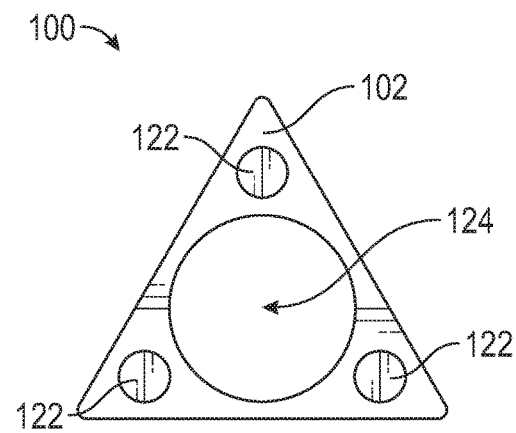
FIGS. 13A-13F illustrate planar front, back, right side, left side, top and bottom views of the attachment chip of FIG. 13.
Figure 13B:
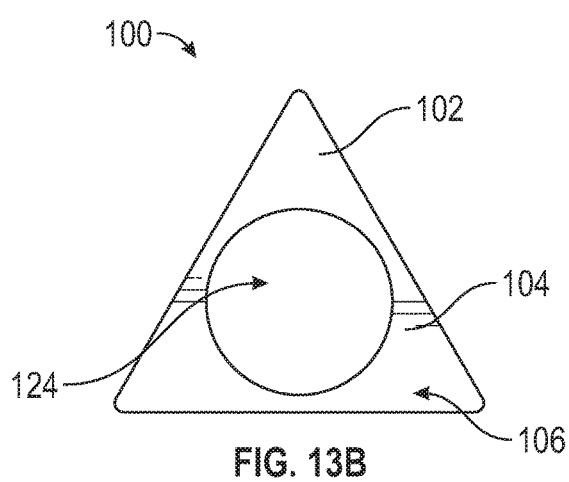
Figure 13C:
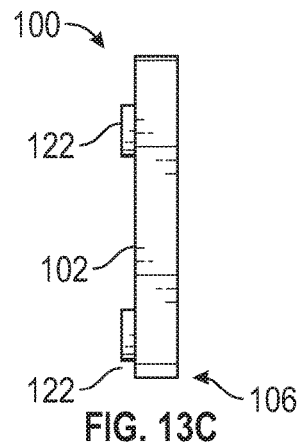
Figure 13D:
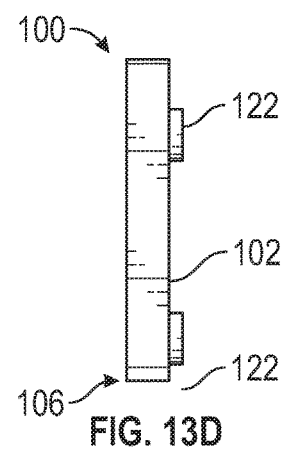
Figure 13E:
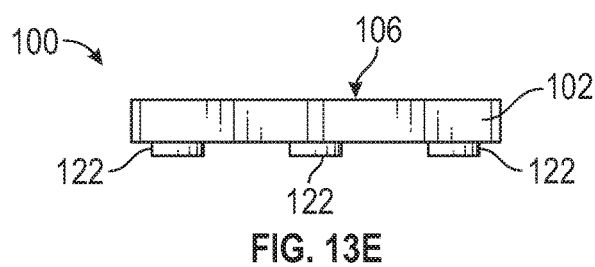
Figure 13F:
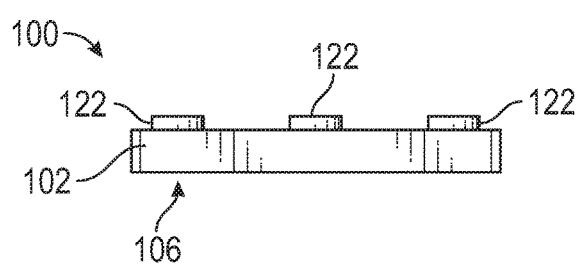
Figure 14:
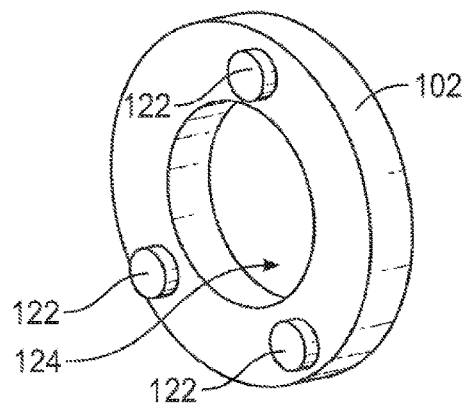
FIG. 14 illustrates a perspective view of a fifth embodiment of an attachment chip in accordance with the present invention.
Figure 14C:
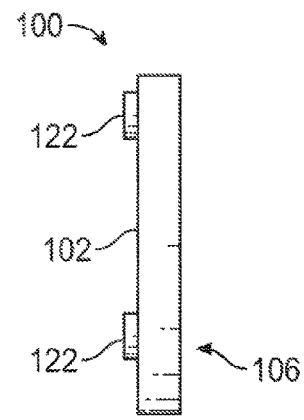
FIGS. 14A-14F illustrate planar front, back, right side, left side, top and bottom views of the attachment chip of FIG. 14.
Figure 14A:
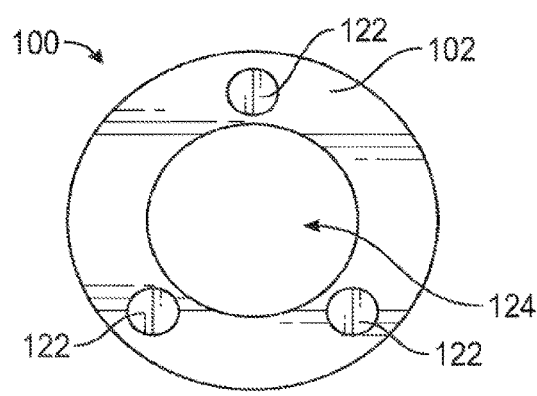
Figure 14D:
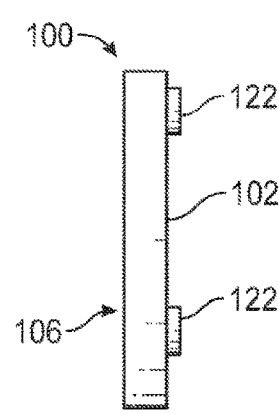
Figure 14B:
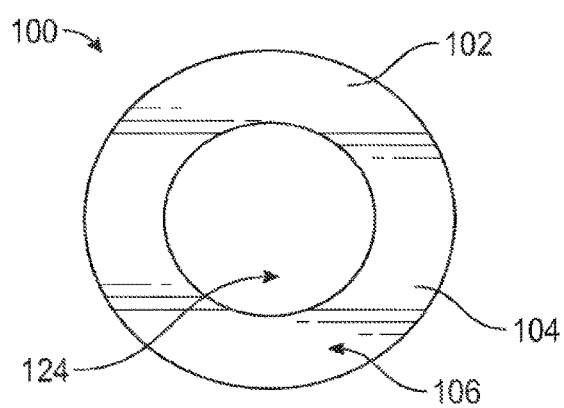
Figure 14E:
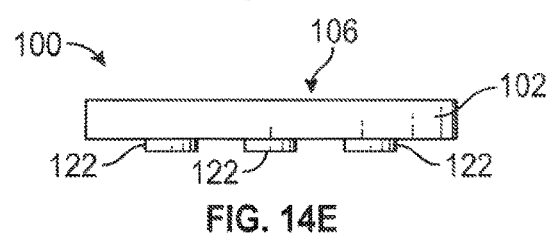
Figure 14F:
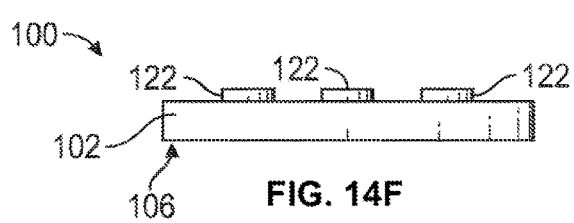
Figure 15:
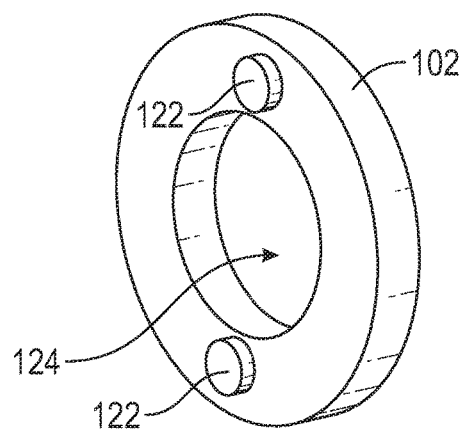
FIG. 15 illustrates a perspective view of a sixth embodiment of an attachment chip in accordance with the present invention.
Figure 15A:
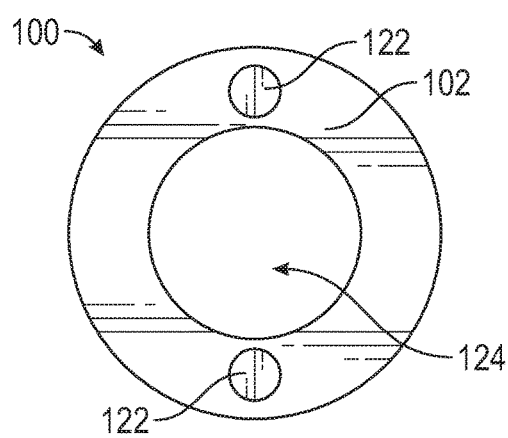
FIGS. 15A-15F illustrate planar front, back, right side, left side, top and bottom views of the attachment chip of FIG. 15.
Figure 15B:
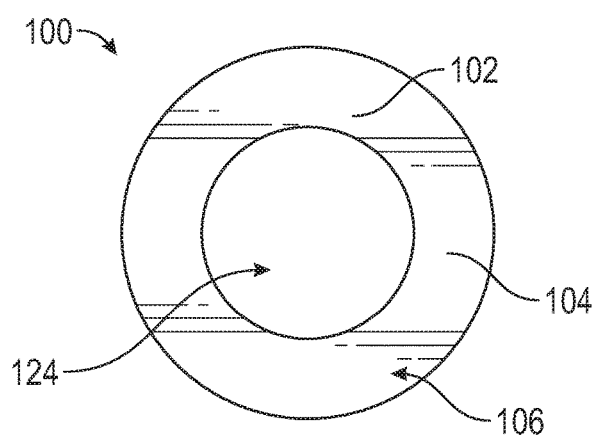
Figure 15C:
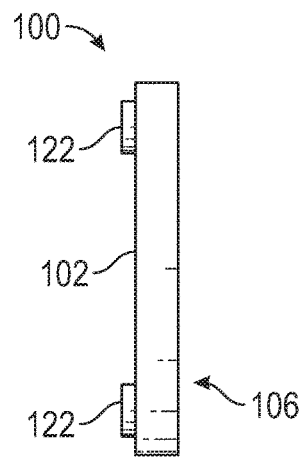
Figure 15D:
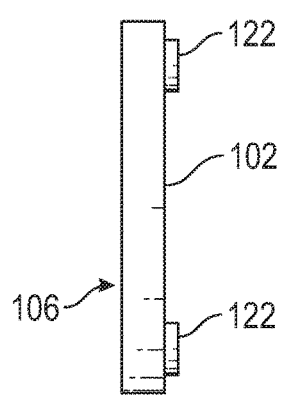
Figure 15E:
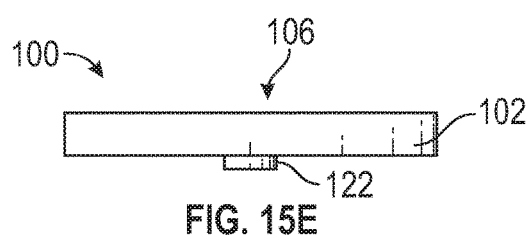
Figure 15F:
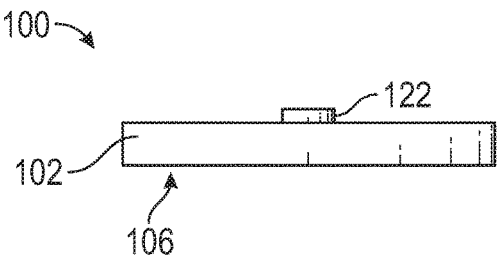
Figure 16:
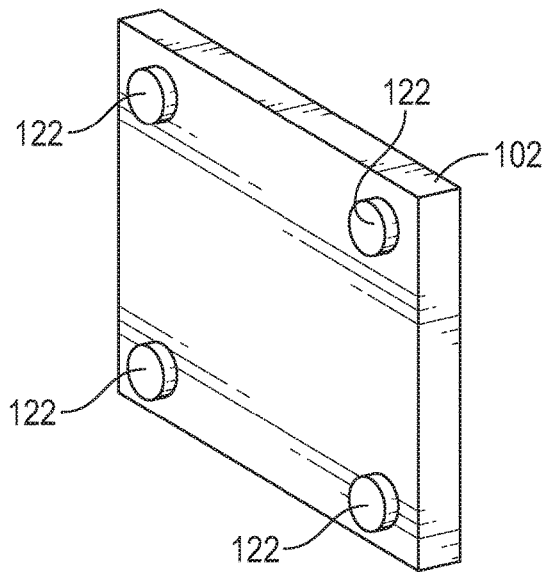
FIG. 16 illustrates a perspective view of a seventh embodiment of an attachment chip in accordance with the present invention.
Figure 16C:
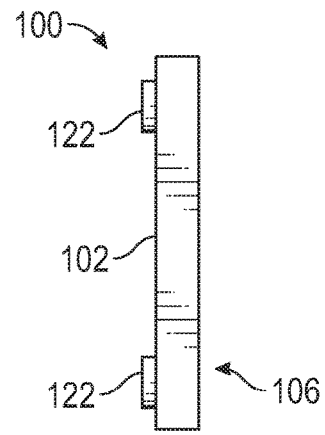
FIGS. 16A-16F illustrate planar front, back, right side, left side, top and bottom views of the attachment chip of FIG. 16.
Figure 16A:
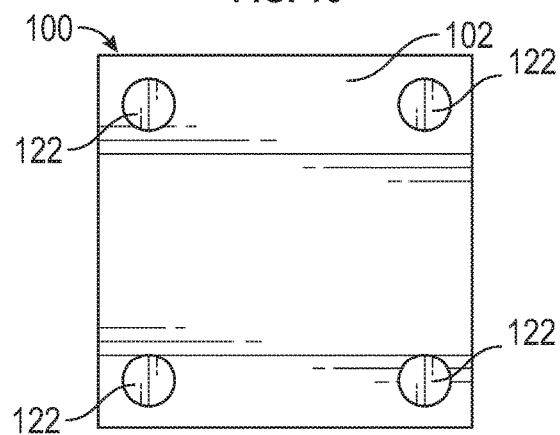
Figure 16D:
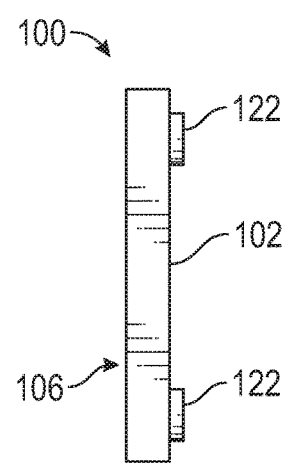
Figure 16B:
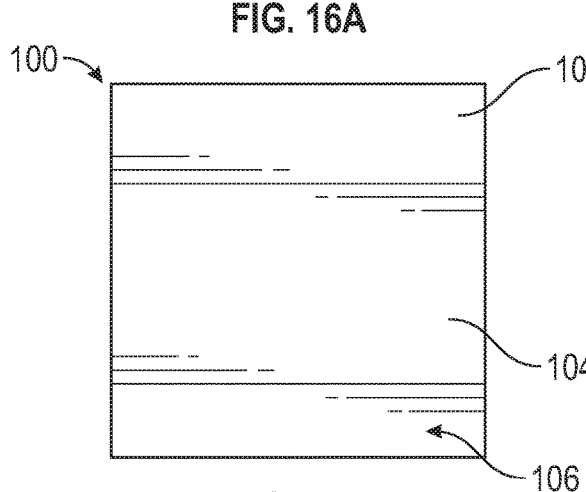
Figure 16E:
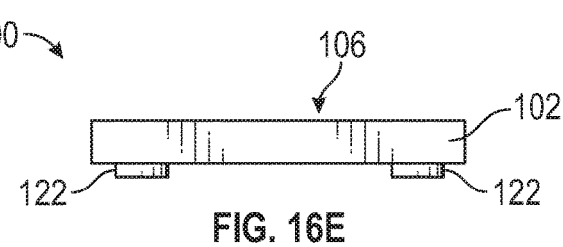
Figure 16F:
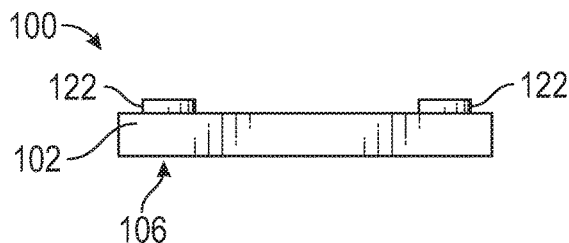
Figure 17:
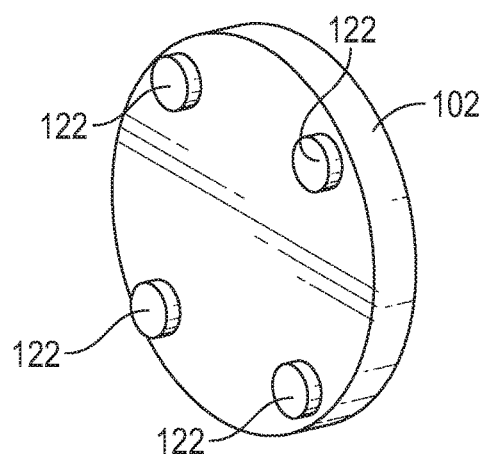
FIG. 17 illustrates a perspective view of an eighth embodiment of an attachment chip in accordance with the present invention.
Figure 17A:
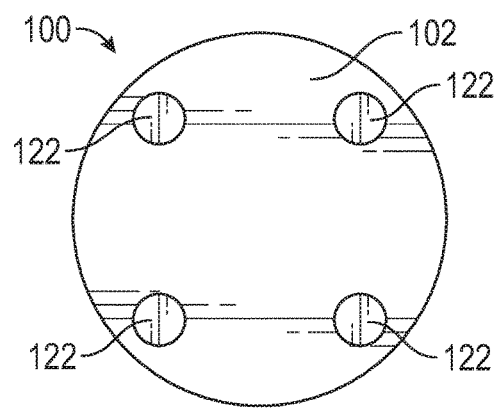
FIGS. 17A-17F illustrate planar front, back, right side, left side, top and bottom views of the attachment chip of FIG. 17.
Figure 17B:
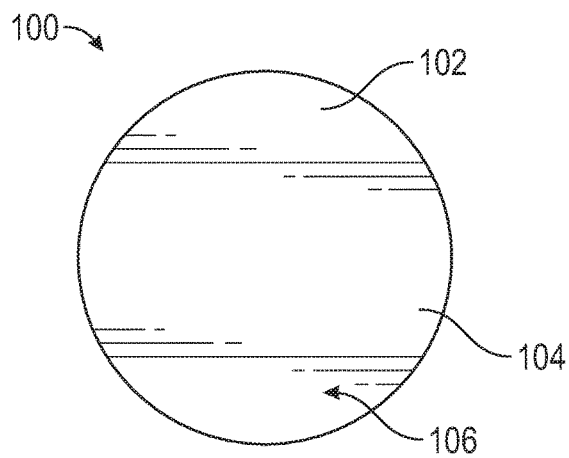
Figure 17C:
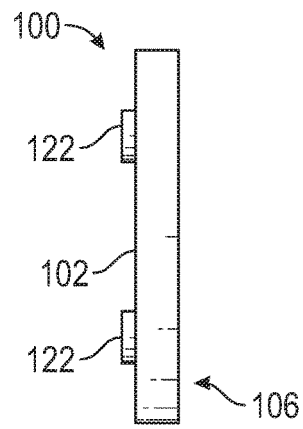
Figure 17D:
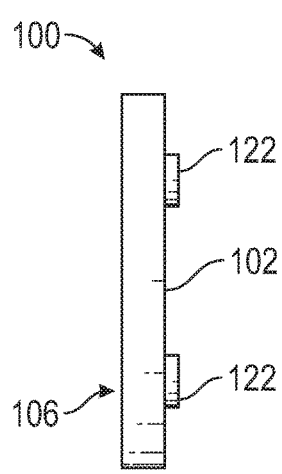
Figure 17E:
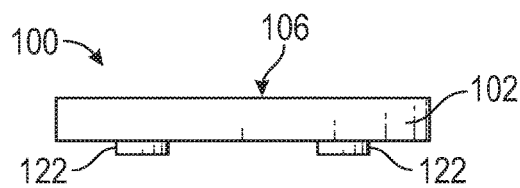
Figure 17F:
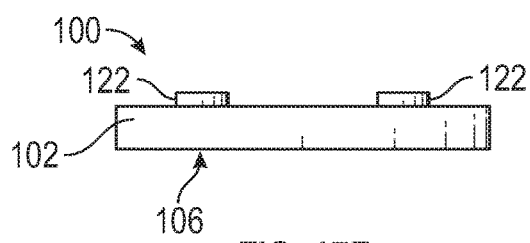
Figure 18:
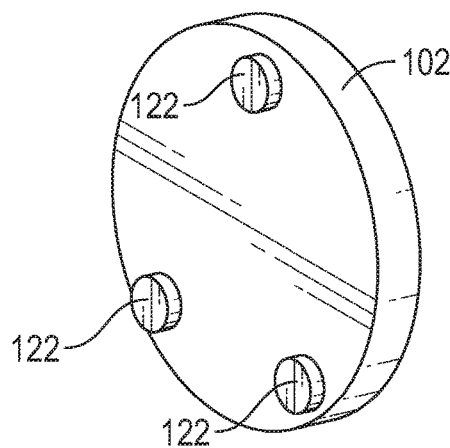
FIG. 18 illustrates a perspective view of a ninth embodiment of an attachment chip in accordance with the present invention.
Figure 18C:
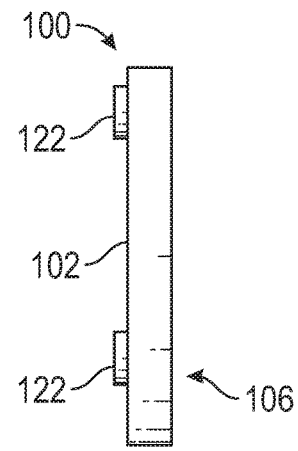
FIGS. 18A-18F illustrate planar front, back, right side, left side, top and bottom views of the attachment chip of FIG. 18.
Figure 18A:
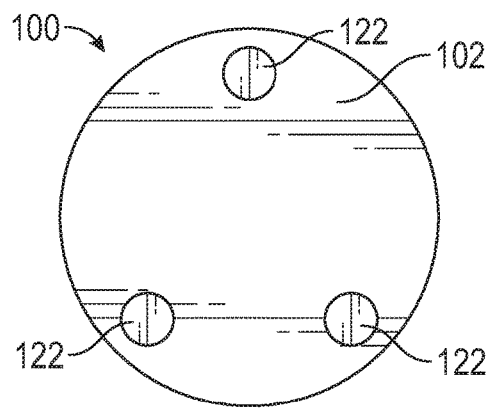
Figure 18D:
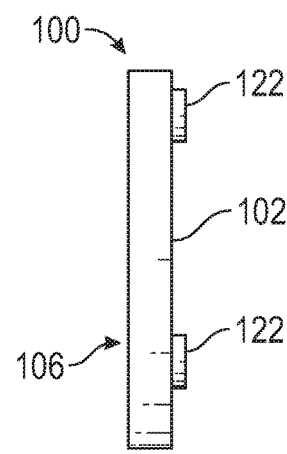
Figure 18E:
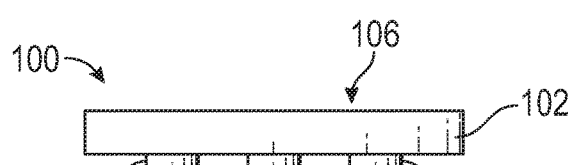
Figure 18B:
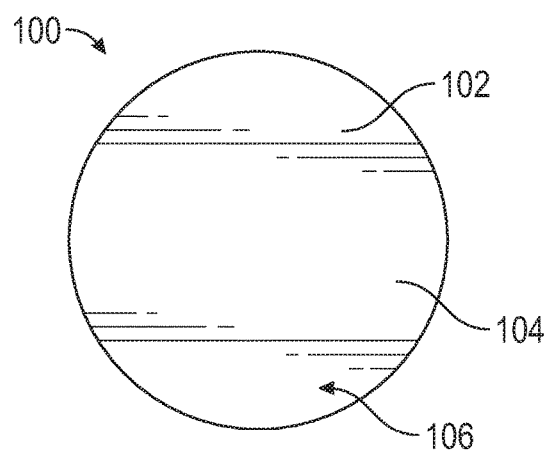
Figure 18F:
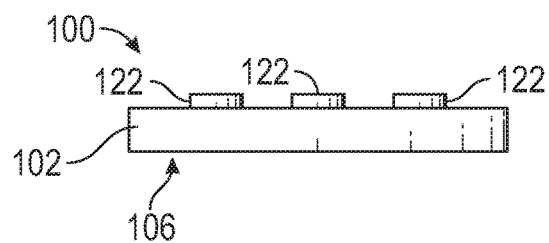
Figure 19:
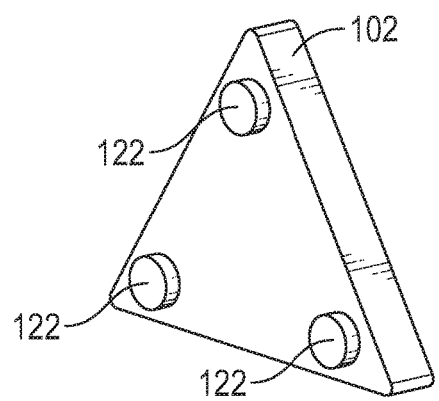
FIG. 19 illustrates a perspective view of an embodiment of a tenth attachment chip in accordance with the present invention.
Figure 19C:
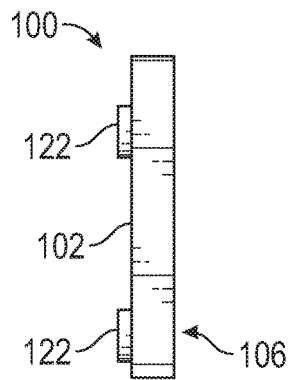
FIGS. 19A-19F illustrate planar front, back, right side, left side, top and bottom views of the attachment chip of FIG. 19.
Figure 19A:
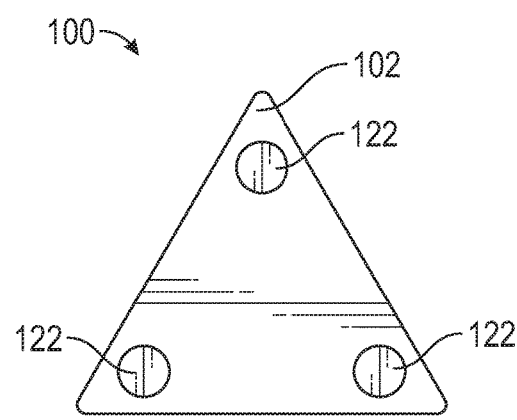
Figure 19D:
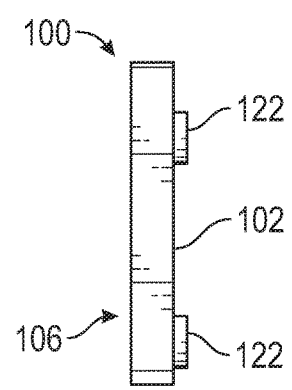
Figure 19B:
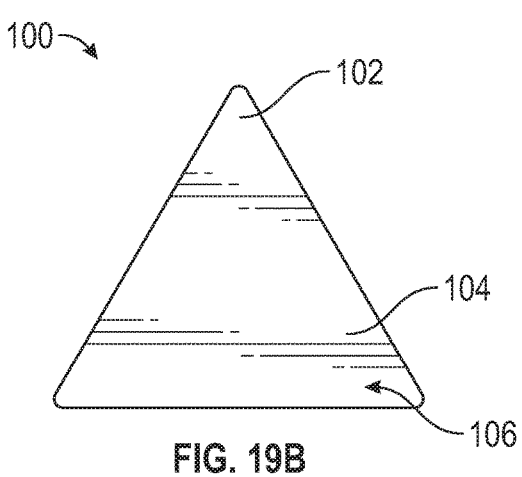
Figure 19E:
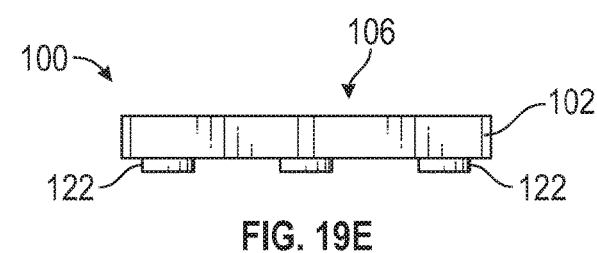
Figure 19F:
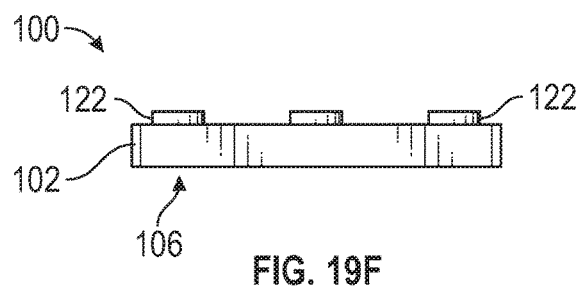

In an alternate embodiment, an attachment chip 100 can be used to provide electronic devices 200 with means for attachment to and proper alignment with the portable charger 10 shown herein. Referring to FIG. 10, an attachment chip 100 comprises a thin, generally flat chip or disc 102 having magnets 122 positioned therein or thereon in a geometric arrangement in a spaced apart relationship to one another, whereby the geometric arrangement generally complements the magnetic array 22 provided on the portable charger 10. While the magnets 122 are illustrated in FIG. 10 as projecting from the chip material, the magnets 122 can be embedded within and even hidden within the chip material without departing from the spirit and principles of the present invention. In generally, the presence of the magnets 122, the projection of the magnets 122 and the thickness of the disc 102 are embellished slightly in the drawing figures to emphasize and highlight features of the present invention.

Figure 21:
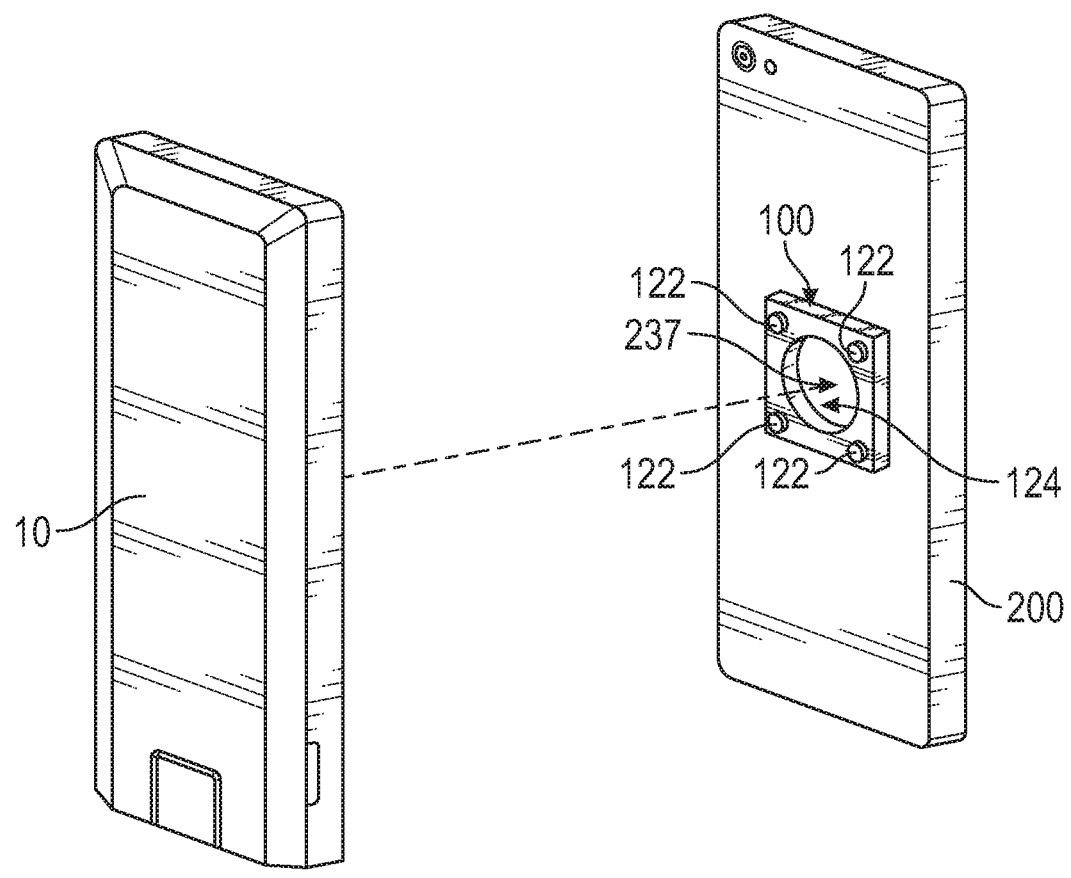
FIG. 21 is an exploded view of the attachment system of the present invention in use illustrating how the portable charger can be attached to an electronic device using an attachment chip in accordance with the present invention.

The attachment chip 100 is preferably manufactured from a thin, generally flat plastic material and includes an adhesive layer 104 or some other means of attaching the chip 100 to the back of an electronic device 200 with which the attachment system is to be used. For example, as shown in FIGS. 10B and 21, 22A and 22B, the chip 100 has an attaching surface 106 that can connect and hold flush to the outer surface of the electronic device 200 using the adhesive layer 104 provided on said attaching surface 106. Preferably, the chip 100 is attached to the electronic device 200 so that the magnetic array 122 of the chip 100 is positioned around the reception area 237 for the device 200 so that the respective magnets 22 and 122 on the portable charger 10 and the attachment chip 100 will align said reception area 237 with the transmission area 27 of the portable charger 10 without interfering with wireless transmissions from the portable charger 10. In this regard, the chip 100 can include a central opening 124 between the magnets 122, such as shown in FIG. 21, for example, to help attach the chip 100 to the electronic device 200 in a desired and predetermined location and orientation.

Figure 22A:
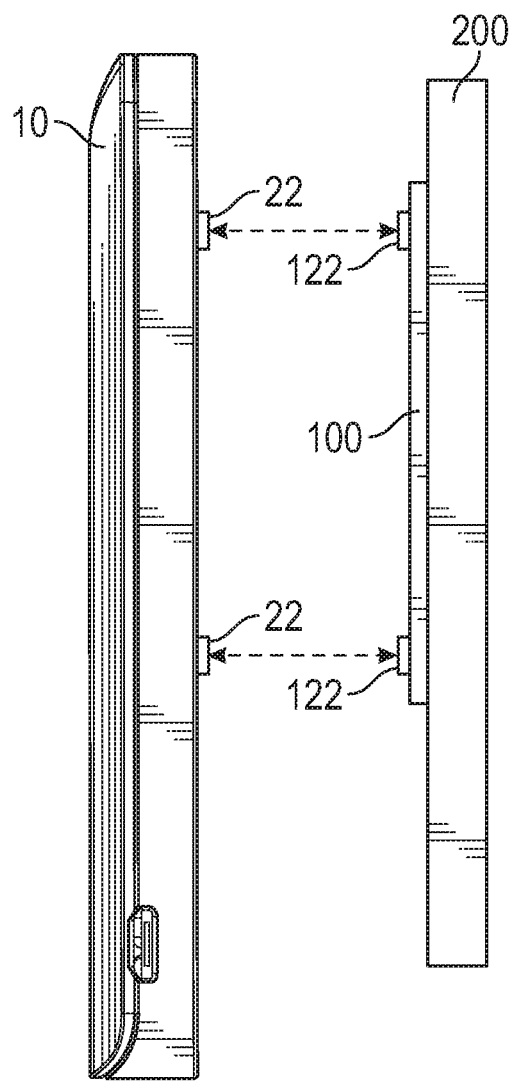
FIGS. 22A and 22B illustrate attachment of a portable electronic device to the portable power charger of FIG. 1 in accordance with an embodiment of the attachment system of the present invention.
Figure 22B:
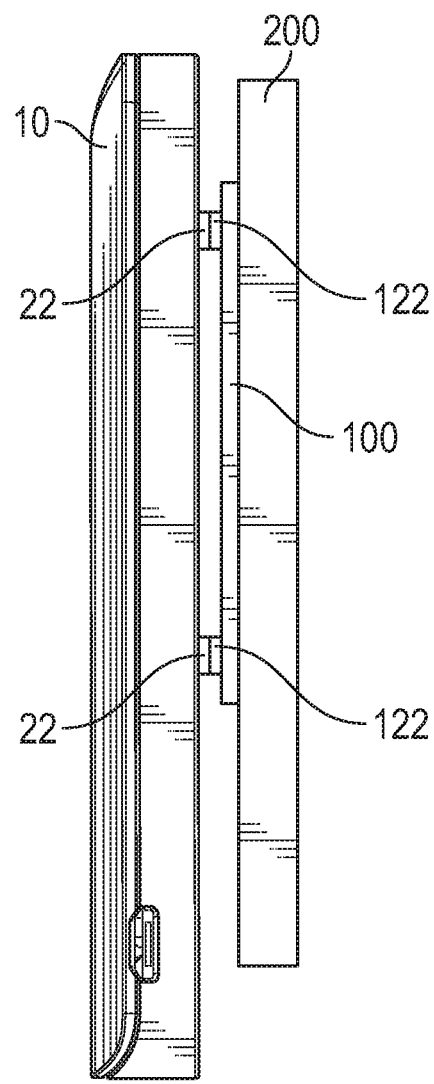

Referring to FIGS. 11-20, various additional and alternate designs, shapes and sizes of attachment chips 100 are illustrated, each including a number of magnets 122 geometrically arranged in accordance with the present invention, and some including central openings 124 for aligning the chip 100 with the reception area 237 of the device 200 to which they are attached. In use, the chip 100 is simply attached to the electronic device 200 around the reception area 237 thereof, such as generally shown in FIG. 21. When it is desirable to wirelessly recharge the electronic device 200, the magnets 122 on the attachment chip 100 can be aligned with the magnets 22 on the portable charger 10, such as shown in FIG. 22A. When the respective magnets 22 and 122 interact, the electronic device 200 will be attached to the portable charger 10 and the complementary shapes of the respective magnetic arrays 22 and 122 will ensure proper alignment of the wireless transmission components to ensure proper and efficient wireless charging, such as shown in FIG. 22B.

Figure 23:
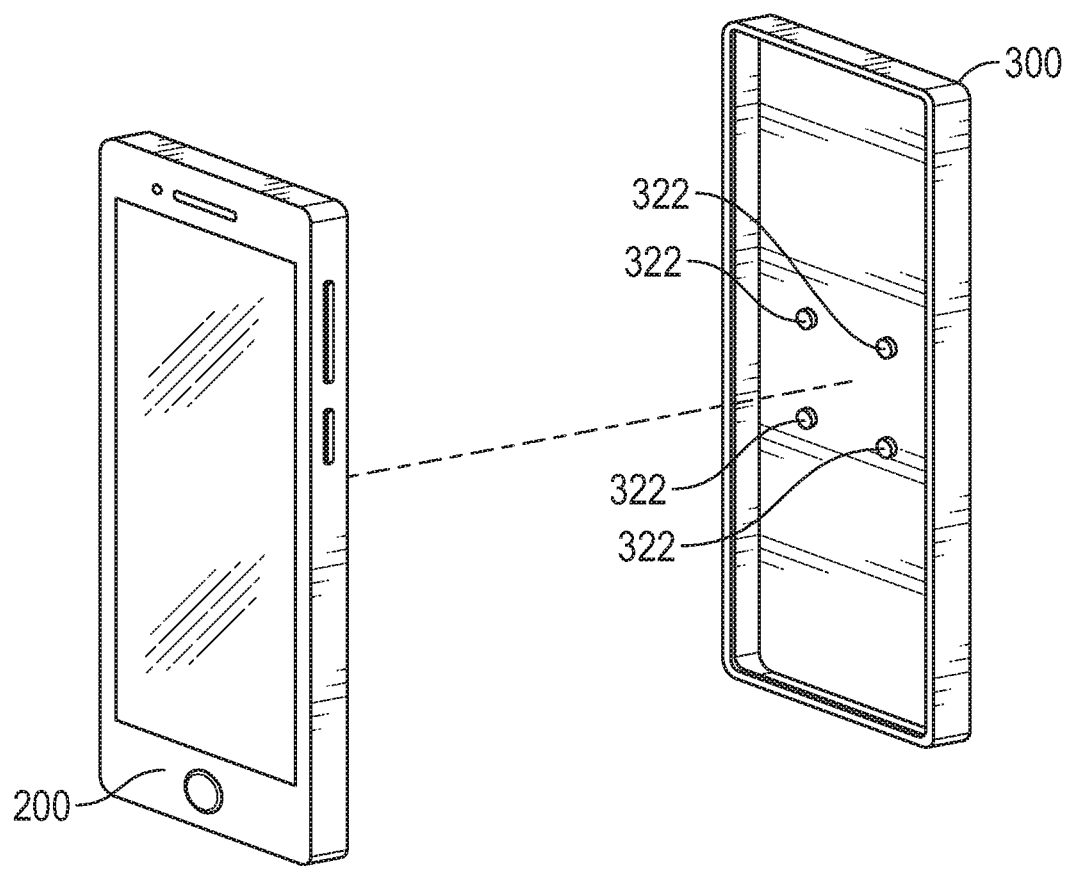
FIG. 23 is an exploded view of an attachment system of the present invention in use illustrating how an electronic device can be attached to an electronic device using an attachment chip in accordance with the present invention.
Figure 24:
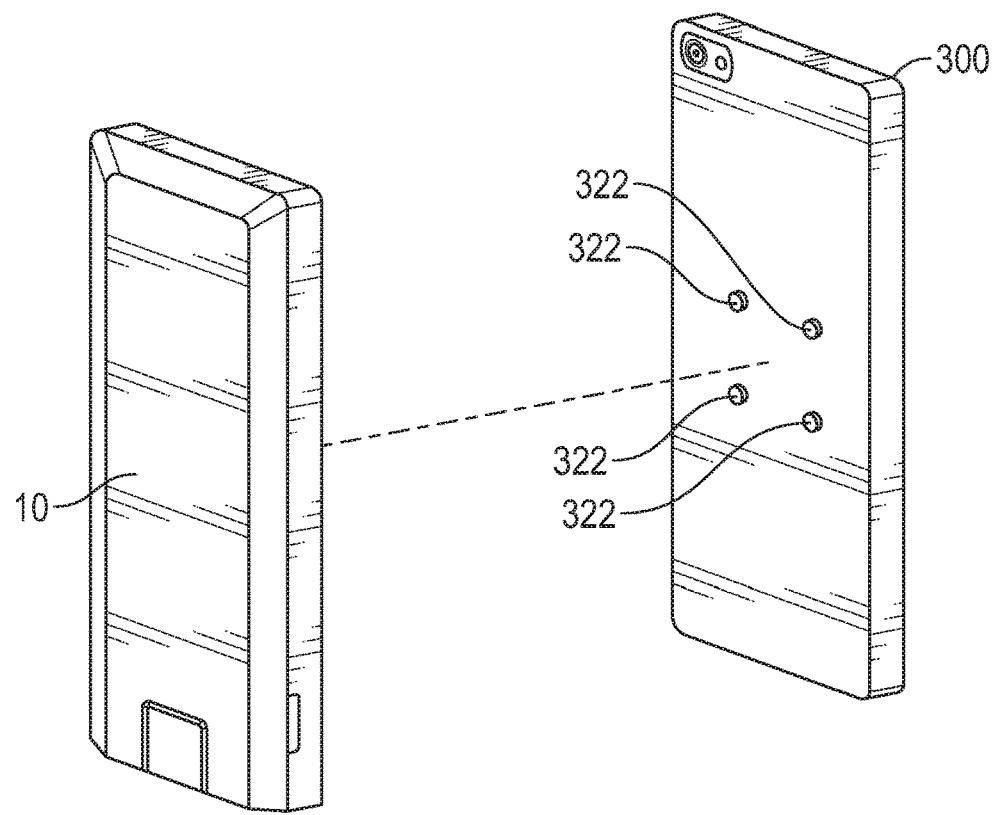
FIG. 24 is an exploded view of the attachment system of the present invention in use illustrating how the portable charger can be attached to an electronic device using a protective case with a magnetic array in accordance with the present invention.
Figure 25:
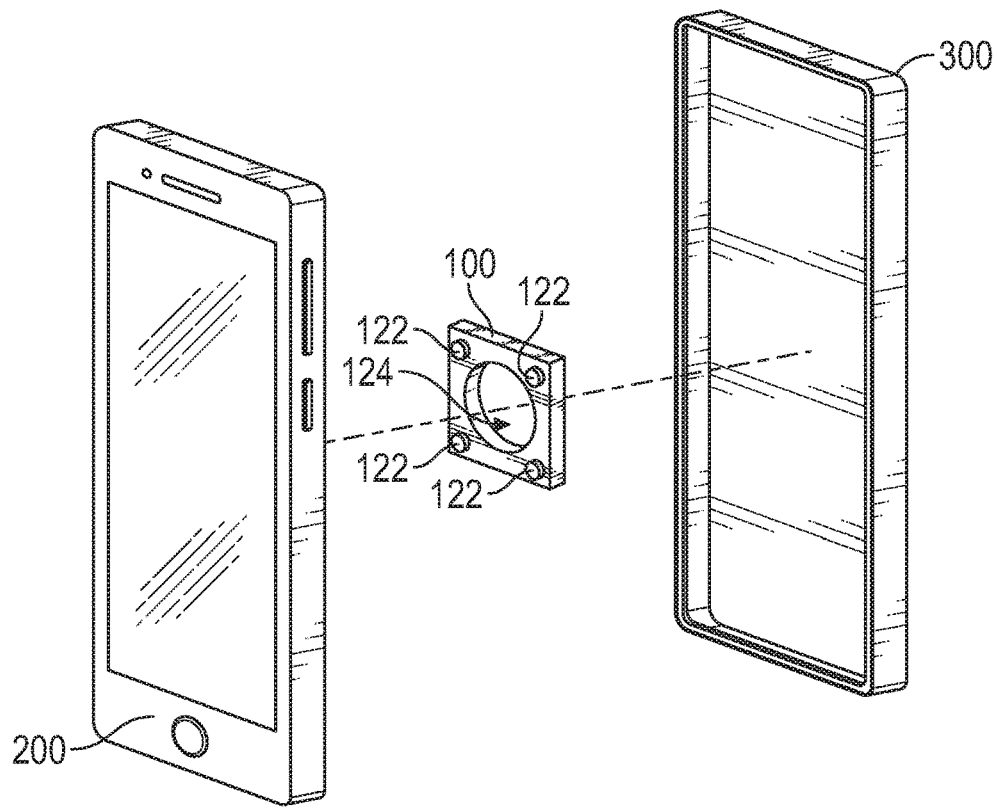
FIG. 25 is an exploded view of an attachment system of the present invention providing an attachment chip between the electronic device and the protective case.

In another embodiment, generally illustrated in FIGS. 23 and 24, a magnetic array 322, as described herein, can also be provided for an electronic device 200 within a protective case 300 designed for the electronic device 200. Such a case 300 may include a magnetic array 322 formed therein, or alternatively, provided by an attachment chip 100 attached between the device 200 and the case 300 (as shown in FIG. 25), whereby the array 322 or 122 is located and oriented at a predetermined position relative to the reception area 237 for the electronic device 200. Thus, when the case 300 is installed on the electronic device 200, the device 200 is provided with the attachment means to effectuate proper and efficient wireless charging from the portable charger 10 when connected thereto.

In alternate embodiments, the magnets 222, 122 or 322 on the electronic device 200, the attachment chip 100, or in the device case 300, can simply be metallic pieces that will interact with the magnet(s) 22 provided on the portable power charger 10.

Figure 8B:
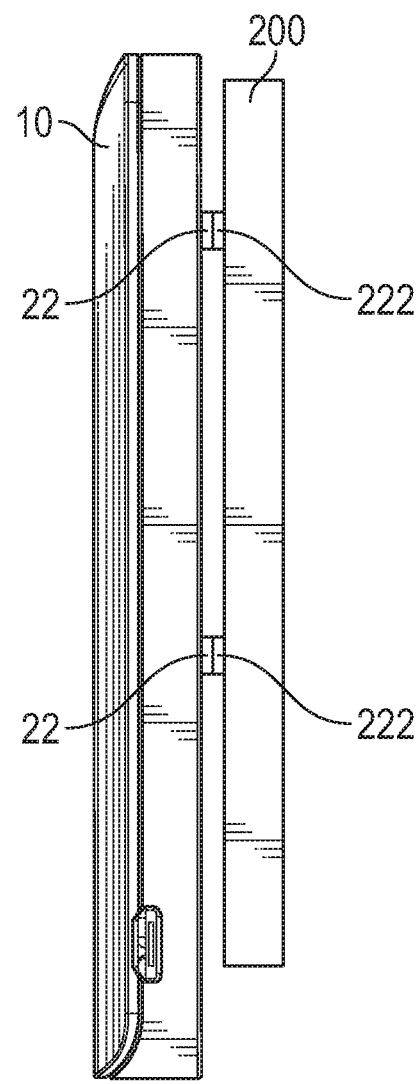

The portable power charger 10 of the illustrated embodiments includes the capability of charging electronic devices via wireless power transmission, as shown in FIG. 8B. In this regard, the portable power charger 10 includes a wireless transmitter 26 for transmitting a charge to an electronic device, as shown in FIG. 6. In alternative or additional embodiments, the portable power charger 10 may also include a wireless receiver 36 for receiving a charge from a wireless charging mat or power transmitting device allowing the charger unit 10 to be recharged either wirelessly or via direct connection to an external power source, and at the same time be connected to multiple electronic devices by both wireless and direct connection means such as disclosed in U.S. Pat. No. 9,318,915, incorporated herein by reference.

The wireless transmitter 26 of the portable power charger 10 generally comprises a magnetic induction coil operatively connected to the internal battery unit 14. Referring to FIG. 3, a wireless transmission area 27 generally aligned with the transmitter coil is illustrated. When an electronic device 200 that includes a wireless receiver is aligned with the wireless transmission area 27, a magnetic field generated by the transmitter 26 is transmitted to the electronic device 200, where a voltage is induced to power the electronic device 200 or recharge its internal battery. In this regard, the designated wireless transmission area 27 is visible to the user so as to facilitate proper alignment and wireless charging. In accordance with preferred embodiments of the present invention, the magnetic array 22 on the portable power charger 10 is arranged around this wireless transmission area 27 so as to first, ensure proper alignment of an electronic device 200 with the wireless transmission area 27, and second, not interfere with wireless transmission from the transmitter induction coil 26. As noted above, an electronic device 200 can be provided with a magnetic arrangement 222 that complements the arrangement 22 on the portable charger 10. Thus, the magnetic arrangement 222 on the electronic device 200 will be positioned relative to a receiver induction coil associated with a wireless receiver in the electronic device 200, and therefore, preferably around a wireless reception area 237 therefor. The complementary arrangements 22 and 222 will ensure connection of the device 200 to the portable charger 10, and more importantly, proper, and preferably unfettered, alignment of the wireless transmission area 27 with the wireless reception area 237.

Figure 5:
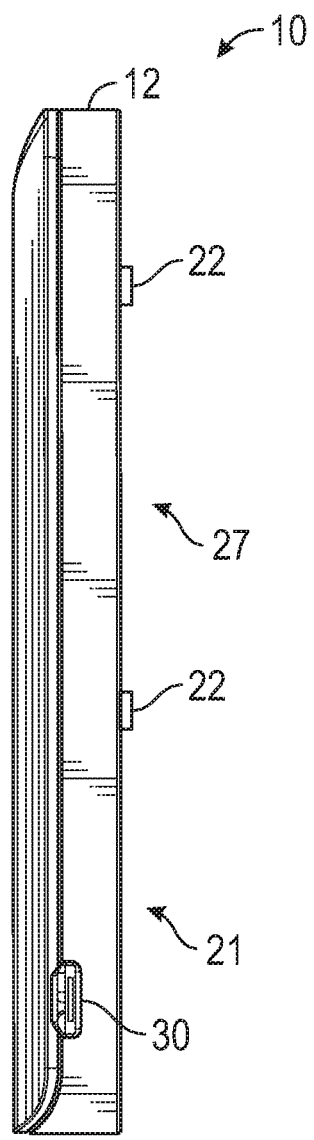
FIG. 5 shows a planar side view of the portable power charger of FIG. 1.
Figure 6:
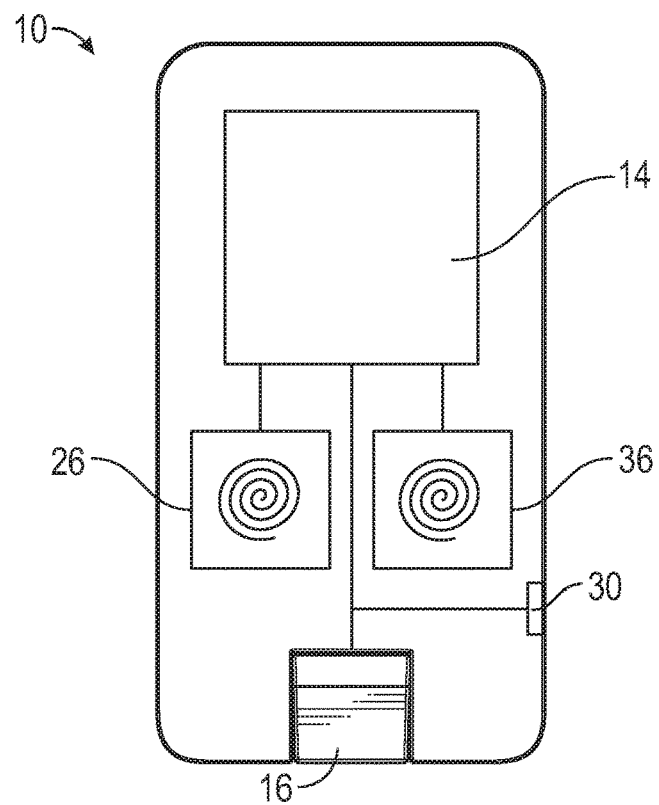
FIG. 6 shows a schematic diagram illustrating internal operational components of the portable power charger of FIG. 1.

Referring to FIG. 5, the portable power charger 10 may include a power connection input port 30 on the charger housing 12. The power connection input port 30 is operatively connected with the internal battery 14 to provided a charge to the internal battery 14 when the power charger 10 is connected to an external power source via the power connection input port 30. As shown, the power connection input port 30 comprises a micro-USB female interface, though the power connection input port 30 can utilize any known connection interface without departing from the principles and spirit of the present invention, including but not limited to a USB interface, a mini-USB interface, an AC-DC interface, or the like. In operation, a separate connector cable can be used to connect the power charger 10 with an external power source via the power connection input port 30.

Figure 4:
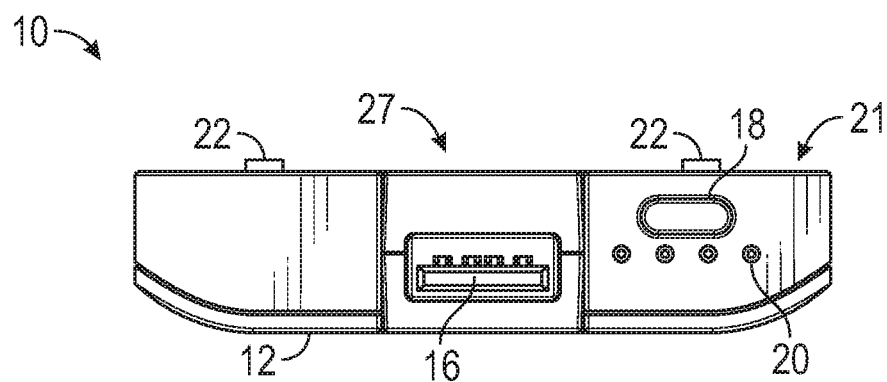
FIG. 4 shows a planar end view of the portable power charger of FIG. 1.

Referring to FIG. 4, a power connection output port 16 may also be provided on the charger housing 12. The power connection output port 16 is operatively connected with the internal battery 14 to provide a charge from the internal battery 14 to an electronic device when the portable power charger 10 is connected to an electronic device via a power connection output port 16. As shown, the power connection output port 16 comprises a USB female interface, though the power connection output port 16 can utilize any known connection interface without departing from the principles and spirit of the present invention, including but not limited to a micro-USB interface, a mini-USB interface, an AC-DC interface, and an adjustable cartridge capable of transforming from a USB female interface to a USB male interface depending on the position of the cartridge (as shown in FIG. 31 and described in further detail below), providing for power output or input or the like.

Figure 29:
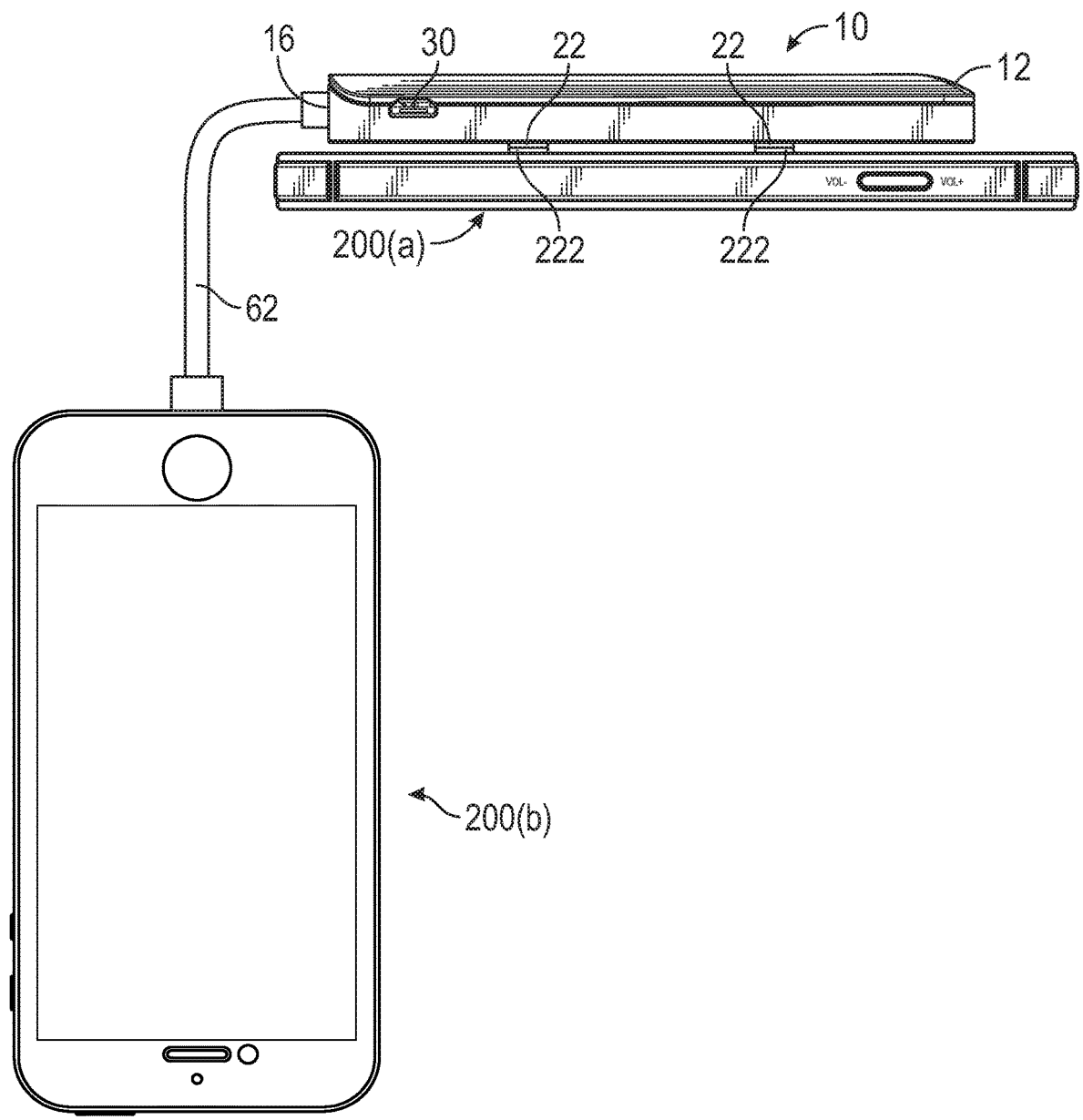
FIG. 29 shows a perspective view of an embodiment of a portable power charger for recharging multiple electronic devices in accordance with the present invention.
Figure 30:
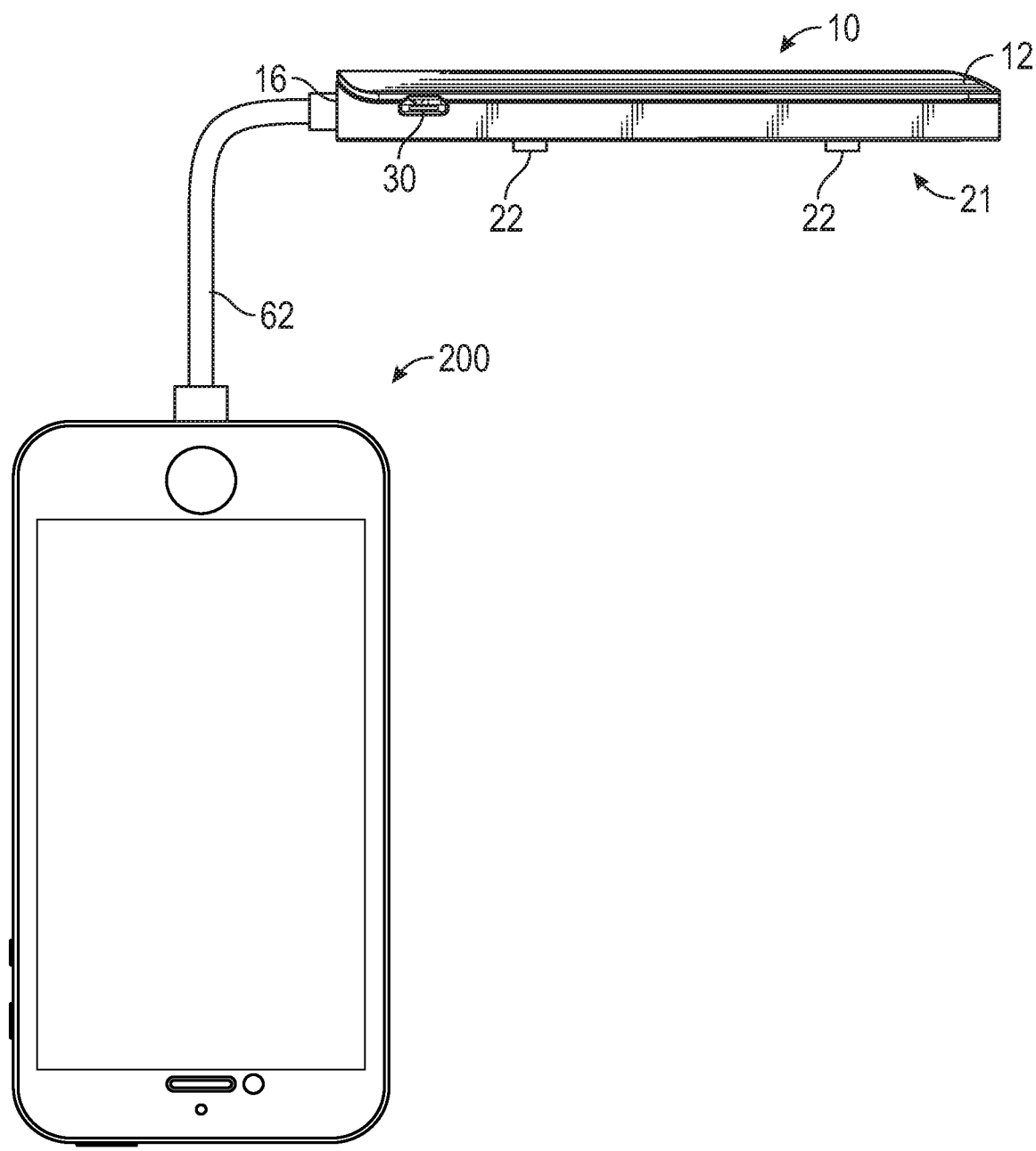
FIG. 30 shows a perspective view of an embodiment of a portable power charger for recharging an electronic device in accordance with the present invention.

In operation, a separate connector cable can be used to connect the portable power charger 10 with an electronic device 200 via the power connection output port 16 (such as cable 62 shown in FIGS. 29 and 30). As shown in FIG. 4, a power capacity indicator means 20 is also provided to indicate the capacity of the internal battery unit 14, as will be described in more detail below.

Figure 1:
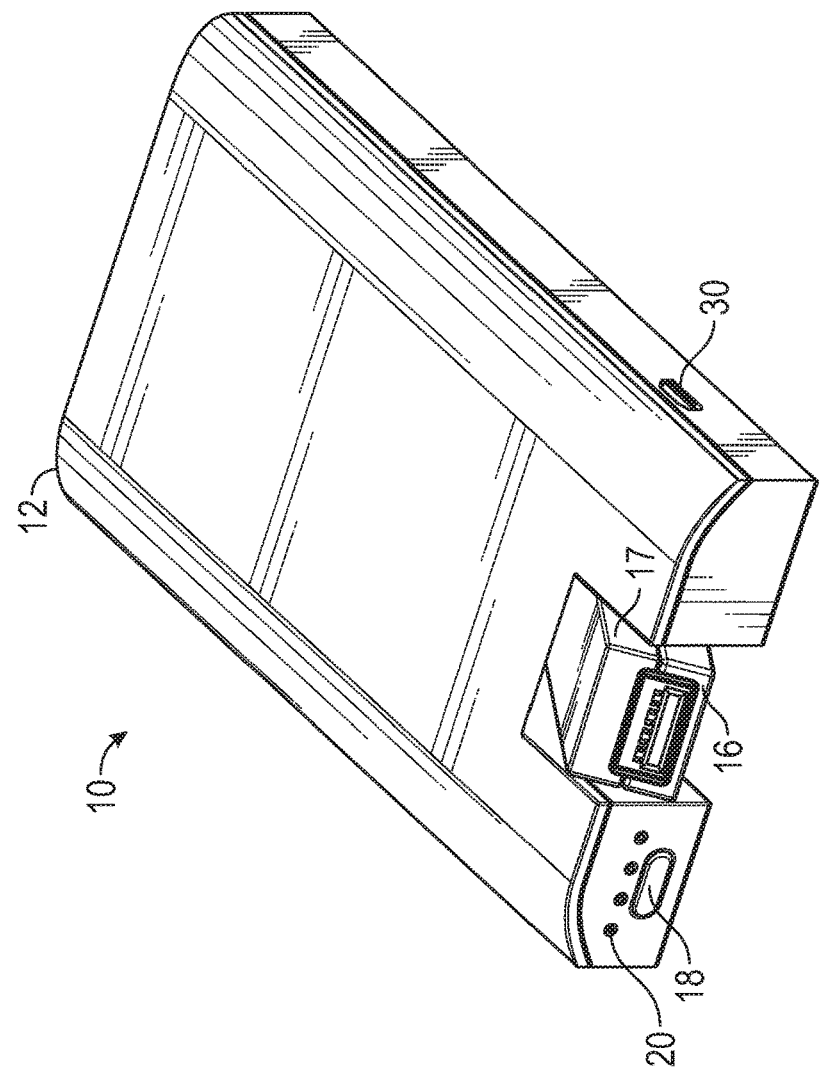
FIG. 1 shows a perspective view of a first embodiment of a portable power charger in accordance with the present invention.

As shown in FIG. 1, the power connection output port 16 is provided on a pivotable cartridge 17. In use, the cartridge 17 provides some flexibility for connecting a charging cable 62 to the output port 16, especially, for example, when the charger 10 is attached to an electronic device 200 in the manner(s) described above. The pivoting of the cartridge 17 is particularly useful when the charger 10 is attached to an electronic device 200 that is larger than the charger 10, making access to the output port 16 difficult if not for the pivotability of the cartridge 17, as shown.

Though the illustrated embodiment shows both a power connection input port 30 and a power connection output port 16, the present invention can use either means for power input or for power output. Further, the portable power charger 10 can use a power connection port that utilize a two-way charging interface, such as described in co-pending U.S. application Ser. No. 13/682,985, incorporated herein by reference, so that the port can act as both a power input and a power output, depending on what is connected to the port.

Figure 31A:
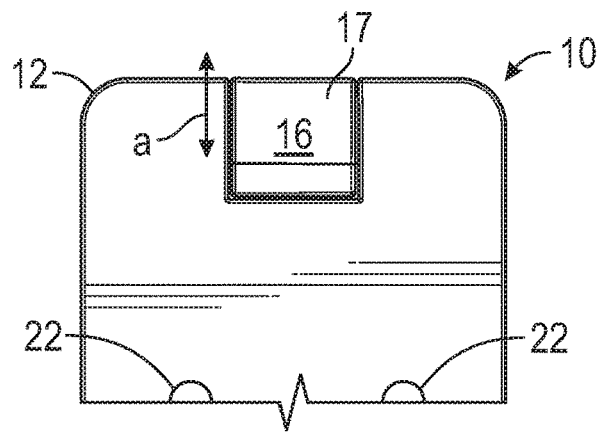
FIGS. 31A, 31A and 31C show partial planar back views of an embodiment of a power charger illustrating a slide-and-pivot power connection interface in accordance with the present invention.
Figure 31B:
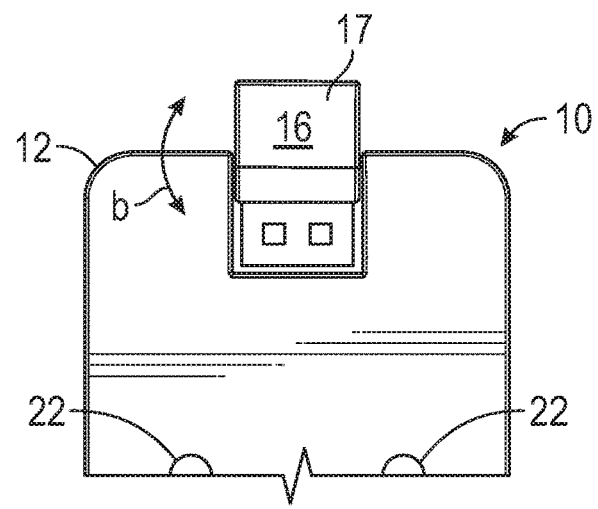
Figure 31C:
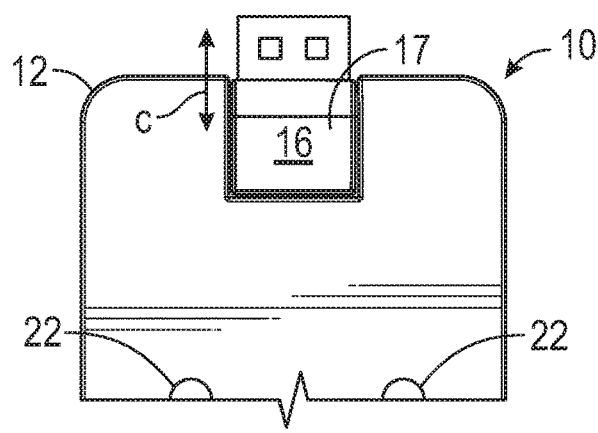

Referring to FIG. 31, an alternate design for a power connection interface is illustrated. As shown, the power connection interface 16 may be located within an adjustable cartridge 17 capable of transforming from a female connection port, as shown in FIG. 31A, to a male connection interface, as shown in FIG. 31C, by first sliding the cartridge 17 out along arrow (a), then pivoting the cartridge 17 along arrow (b) to expose a male interface, and then sliding the cartridge 17 along arrow (c). In such a design, a storage cavity is formed in the charger housing 12 for receiving the male interface when the cartridge 17 is positioned as shown in FIG. 31A. The adjustable cartridge 17 allows the connection interface 16 to be used as a female or male, input or output interface. In an alternate embodiment, the adjustable cartridge 17 can include only a male connection interface that can be stored when not in use as shown in FIG. 31A, and positioned for use, as needed, as shown in FIGS. 31B and 31C.

Figure 26:
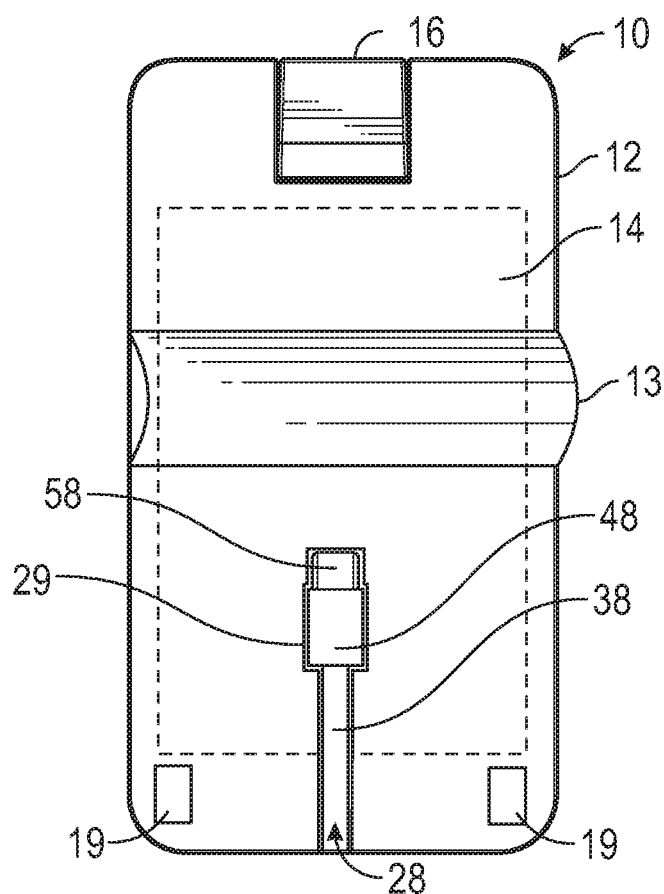
FIG. 26 shows a planar front view of an alternate embodiment of a portable power charger in accordance with the present invention.
Figure 27:
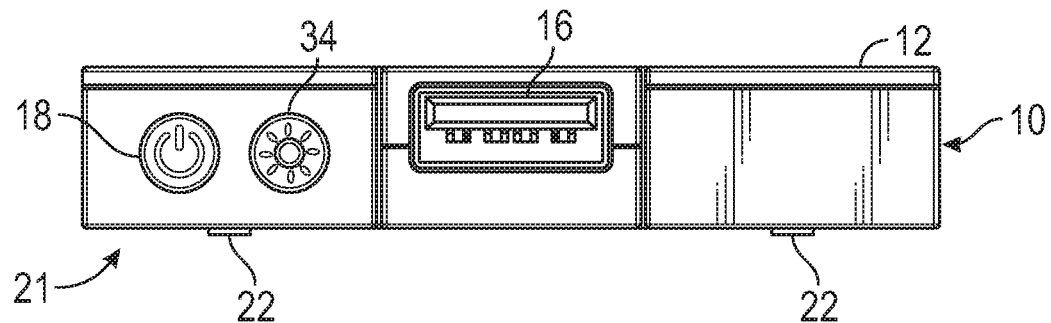
FIG. 27 shows a planar end view of the portable power charger of FIG. 26.
Figure 28:
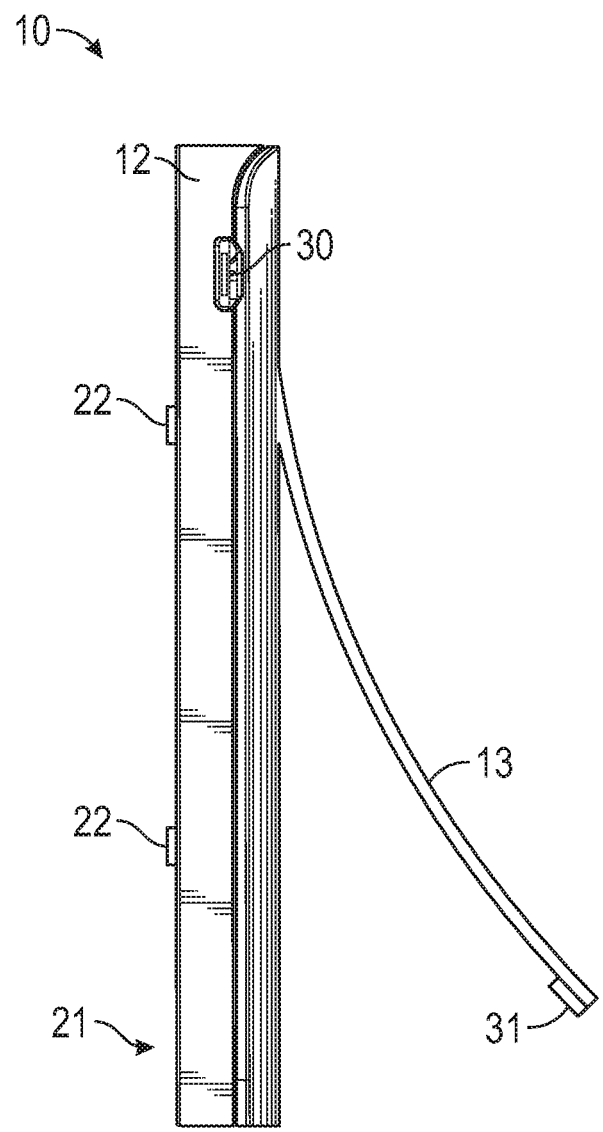
FIG. 28 shows a planar side view of the portable power charger of FIG. 26.

A portable power charger 10 in accordance with an alternate embodiment of the present invention is shown in FIGS. 26-28. Referring to FIG. 26, the portable power charger 10 may include one or more built-in power output connector cables 28 provided with the charger housing 12 for connecting the portable power charger 10 with electronic devices. The connector cable 28 is preferably stored within a respective cavity 29 formed in the charger housing 12 when not in use, and removed from the cavity 29 for use. The power output connector cable 28 is operatively connected with the internal battery 14 for providing a charge to a respective electronic device 200 connected to the power charger 10 via the connector cable 28. As illustrated, the connector cable 28 comprises a cord portion 38 and a head portion 48 having a connection interface 58 designed for engagement with an electronic device or an adapter unit.

The cavity 29 for the connector cable 28 is preferably designed to have a complementary shape to the connector cable 28 so that the cable 28 can be stored within the general volume and footprint of the charger housing 12 when not in use. Referring to FIGS. 26 and 28, the charger housing 12 includes a flexible cover 13 (e.g., a leather or polyurethane cover) on its surface. The flexible cover 13 can be peeled or rolled back at one end to expose the output connector cable 28. When the cover 13 is laid flat, it covers and hides the connector cable 28. The charger housing 12 also houses hold-down pads 19, which may be magnets or hook-and-loop pads, or the like. The hold-down pads 19 hold the flexible cover 13 in place for protection and aesthetics when it is not peeled or rolled back to expose the connector cable interface 28. Corresponding hold-down pads 31, which may be magnets or hook-and-loop pads, or the like, on the underside of the flexible cover 13 align with the hold-down pads 19 to hold the flexible cover 13 in place. In this regard, the existence of the connector cable interface 28 does not interfere with use of the portable power charger 10, and further does not detract from the size and appearance of the charger 10.

When the power output connector cable 28 is needed for use, it can be disengaged from its cavity 29 and extended away from the charger housing 12 so that the head portion 48 and interface 58 can engage an appropriate electronic device or adapter unit. The interface 58 can utilize any known connection interface without departing from the principles and spirit of the present invention. The cord portion 38 can be disengaged from the cavity 29 to flex the connector cable interface 28 outwardly from the charger housing 12. Finger spaces (not shown) can be provided to assist the user to get a grip on the connector cable interface 28. Alternatively, the power output connector cable interface 28 can be retracted within the charger housing 12 to respective non-use positions, for example, using a spring-biased retraction mechanism as is generally known in the art.

Referring to FIG. 27, an exemplary charging indicator 34, usable in all the embodiments of the present invention, may be provided to indicate that an electronic device 200 is being wirelessly charged from the portable power charger 10. As illustrated, the charging indicator 34 is an LED light. The charging indicator 34 may glow in different colors according to power flow—e.g., red when charging the battery 14 via the input connection port interface 30; green when charging an electronic device from the battery 14 via the connection cable interface 28 or the power connection port interface 16; blue when charging a mobile device from the battery 14 via the wireless transmitter 26.

As noted, a wireless receiver 36 can also be provided in the charger 10. In operation, placing the charger 10 on a wireless transmission device, such as a wireless charging mat, so that the receiver 36 aligns with a transmitter in the wireless transmission device will recharge the internal battery 14 via a wireless connection. A receiver 36 generally comprises a magnetic induction coil operatively connected to the internal battery 14, as generally illustrated in FIG. 6. Though schematically illustrated as side-by-side in FIG. 6, this representation of the transmitter 26 and receiver 36 is merely provided for illustration purposes and in practice, the transmitter 26 is generally in line with the receiver 36 so that the transmission area 27 and the reception area for the charger 10 are generally centered within the charger housing 12.

Operation of the portable power charger 10 to transmit a charge to an electronic device 200 via direct connection means or via wireless transmission means may be controlled by a power interface 18, such as an on/off button, as shown in FIGS. 4 and 27.

The wireless charging capabilities of the portable power charger 10 in accordance with the present invention are beneficial in that they improve upon the convenience provided by wireless charging technology. For example, a portable electronic device 200 can be recharged on-the-go even when the proper charging connector or cable is not available. Indeed, the compact and portable design of the portable power charger 10 can permit charging of an electronic device 200 in the user's pocket or purse simply by attaching the portable power charger 10 to the electronic device 200 or an electronic device case 300 for said device 200, and ensuring that the electronic device 200 is properly aligned with and proximate to the portable power charger 10. Additionally, once the portable power charger 10 is charged, a portable electronic device 200 can be recharged without needing to be near an external power source, such as a wall socket, a car charger socket, an airplane charger socket, or a computer, which may not be readily available.

The portable power charger 10 of the present invention also permits recharging of multiple electronic devices via direct connection and wireless power transmission at the same time, as shown, for example, in FIG. 29 and described in further detail below. In addition, in various embodiments the portable power charger 10 can be used to recharge multiple electronic devices via direct connection and/or wireless power transmission at the same time as disclosed inn U.S. Pat. No. 9,318,915, incorporated herein by reference. Further, in various embodiments including both a wireless transmitter 26 and a wireless receiver 36, the portable power charger 10 can transmit a charge while it is being recharged on a wireless charging mat, for example, as disclosed in U.S. Pat. No. 9,318,915.

In preferred embodiments of the present invention, the portable power charger 10 can be automatically turned on when an electronic device 200 is connected to the portable power charger 10 via a power connector cable interface 28 or a power connection port interface 16 or wirelessly. Further, the power charger 10 can use a power-off logic that automatically turns the charger 10 off after a pre-designated time period, provided certain criteria have been met. Such a protocol is described in co-pending U.S. application Ser. No. 13/682,985, with is incorporated herein by reference, whereby the portable power charger 10 will automatically turn off after a predefined time delay after it is determined that the internal battery of all electronic devices connected to the portable power charger 10 are fully charged. Additionally, a manual power interface 18, such as the on/off button shown in FIGS. 4 and 27, can be provided to turn the power charger 10 on and off as desired.

Referring to FIG. 4, the charger housing 12 includes a power capacity indicator means 20 that indicates the remaining capacity of the internal battery 14 in the charger unit 10. In an embodiment of the present invention, as illustrated in FIG. 4, the power indicator means 20 comprises a series of lights, which can include more or fewer lights without departing from the principles and spirit of the present invention, that light up to indicate the power level of the internal battery 14. In operation, a processing unit disposed within the charger 10 communicates with the internal battery 14 to determine how much capacity is remaining in the battery 14. Upon determining the capacity level, the processing unit communicates with the power capacity indicator means 20 to provide the user with the appropriate signal for showing how much capacity is remaining in the internal rechargeable battery 14. For example, when the battery 14 is at full capacity, all the lights in a series of lights will be lit up, or alternatively, a specific light associated with the "full" designation (F) will be lit up. As the battery power decreases, the lights correspondingly decrease by one, or alternatively, will switch as appropriate as the power is used. If there is no capacity left in the internal battery unit 14, none of the lights will be lit up, or alternatively, an "empty" indicator (E) may be lit up. For example, in an embodiment of the present invention, illustrated in FIG. 4, the power indicator means 20 comprises a series of four lights. When the internal battery 14 is at 76%-100% charge, all four of the lights will be lit up; when the battery is at 51% to 75% charge, three of the four lights will be lit up; when the battery is at 26% to 50% charge, two of the four lights will be lit up; and when the battery is >0% to 25% charge, one of the four lights will be lit up. The indicators may further be colored coordinated so that, for example, a green light corresponds to full battery capacity, a yellow light corresponds to half battery capacity, and a red light corresponds to an empty battery 14. Alternatively, a single light, can change color to indicate the power level. For example, when the charge is high, the light can be green; when the charge is medium, the light can be yellow, and when the charge is low or exhausted, the light can be red. Still further, the power capacity indicator means 20 can comprise a digital interface that provides a battery capacity level for the internal rechargeable battery 14, or any other known means of providing battery level information.

In operation, a portable power charger 10 in accordance with the present invention can be used in a variety of manners for recharging the power charger 10 itself, as well as for recharging portable electronic devices 200. As a result of the compact size of the portable power charger 10 and the capacity of the built-in power bank, the portable power charger 10 can be used on-the-go to recharge a variety of electronic devices, including but not limited to smart phones, mobile phones, data tablets, music players, cameras, camcorders, gaming units, e-books, Bluetooth® headsets and earpieces, GPS devices, and the like, either individually or simultaneously in various combinations.

In preferred embodiments, the rechargeable battery 14 is preferably a Lithium-Ion battery that can be recharged by connecting the portable power charger 10 to an external power source, such as a computer, a wall socket, a car or an airplane power supply, or to a wireless power transmission device, such as a wireless charging mat. The rechargeable battery 14 is disposed within the charger housing 12 and is operatively connected with any and all input and output connector cable interfaces, input and output connector port interfaces, and any and all wireless receivers and wireless transmitters for receiving a charge from an external power source and transmitting a charge to one or more electronic devices connected to the portable power charger 10, either wirelessly or through power output means.

Referring to FIG. 8B, an electronic device 200, such as a smart phone, is wirelessly charged from the portable power charger 10 by connecting and aligning the electronic device 200 to and with the charger 10 using the respective magnetic arrangements 22 and 122 provided thereon so that a charge is transmitted from the transmitter 26 of the power charger 10 to a wireless receiver of the phone 200. As so connected, the transmitter 26 is aligned with the receiver of the phone 200 so as to facilitate and maximize wireless charging with little effort.

Referring to FIG. 29, the portable power charger 10 in accordance with the present invention can be used to recharge multiple electronic devices simultaneously. For example, an electronic device 200a is attached to the portable charger 10 using the attachment system described herein, and can be recharged via wireless connection with the portable power charger 10, while another electronic device 200b is recharged via direct connection with the power charger 10 through a separate connector cable 62, as shown in FIG. 29, or a built-in power output connector cable interface 28, as shown in FIG. 26.

Referring to FIG. 30, the portable charger 10 in accordance with the present invention can be used to recharge an electronic device 200 via a direct connection between the electronic device 200 and the power output connection port 16 of the portable charger 10 using a separate connector cable 62. Thus, for example, the portable charger 10 of the present invention, while optimally designed for wireless connection and transmission, can also be used to recharge electronic devices that may not have the appropriate wireless transmission/reception components.

The charger housing 12 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.), in addition to wireless transmission of power.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A wireless charging kit for connecting and aligning an electronic device having a rechargeable internal battery and a wireless receiver defining a wireless reception area to a power source for wireless charging of the internal battery of said electronic device, said kit comprising:
    a portable power charger comprising:
        a charger housing internally storing a rechargeable battery;
        a wireless transmitter disposed within the charger housing and operatively connected to the rechargeable battery capable of wirelessly transmitting power to an electronic device, said wireless transmitter defining a wireless transmission area; and
        at least one magnet positioned on or near an outer surface of the charger housing at a predetermined location relative to the wireless transmission area; and
    an attachment chip adapted for attachment to the electronic device, said attachment chip including a number of magnets complementing the number of magnets on the charger housing, whereas when the attachment chip is attached to the electronic device, the magnets are positioned at respective locations relative to the wireless reception area for said electronic device such that when the electronic device is connected to the portable charger via interaction of the respective magnets, the wireless receiver of the electronic device is aligned with the transmitter of the portable charger for wireless exchange of a power from the transmitter to the receiver, and
    wherein said portable charger maintains physical and wireless connection with the electronic device during collective transport of the portable charger and the electronic device.

2. The wireless charging kit according to claim 1, wherein the at least one magnet on the charger housing comprises a plurality of magnets geometrically arranged on or near the outer surface of the charger housing in spaced apart relationship to one another; and
    wherein the attachment chip includes a complementary number of magnets arranged in the same geometrical arrangement and space apart relationship as for the plurality of magnets on the portable charger.

3. The wireless charging kit according to claim 2, wherein the geometrical arrangement of magnets on the portable charger defines a central space generally aligned with the wireless transmission area so that the magnets do not interfere with transmission from the wireless transmitter.

4. The wireless charging kit according to claim 2, wherein the plurality of magnets comprises four magnets generally arranged to define a square.

5. The wireless charging kit according to claim 1, wherein the attachment chip comprises a generally flat disc having an attachment surface adapted for attachment to a surface of the electronic device.

6. The wireless charging kit according to claim 5, wherein the attachment chip has an adhesive material on the attachment surface for attaching the chip to the electronic device.

7. The wireless charging kit according to claim 5, wherein the disc defines an opening with the number of magnets spaced therearound, said opening generally being aligned with the wireless reception area associated with the wireless receiver of the electronic device when the attachment chip if attached to said electronic device so that the magnets on the attachment chip do not interfere with reception of wireless signals by the wireless receiver.

8. The wireless charging kit according to claim 7, wherein the disc is shaped as a square with a circular opening.

9. The wireless charging kit according to claim 7, wherein the disc is shaped as a circle with a circular opening.

10. The wireless charging kit according to claim 7, wherein the disc is shaped as a triangle with a circular opening.

11. The wireless charging kit according to claim 1, wherein the attachment chip is adapted for mounting within a case designed to be fitted onto the electronic device, the magnets of the attachment chip being positioned relative to the wireless reception area of the electronic device in a predetermined location so that when the electronic device is connected to the portable charger via interaction of the respective magnets, the wireless receiver of the electronic device is aligned with the transmitter of the portable charger for wireless exchange of a power from the transmitter to the receiver.

12. A wireless charging kit for connecting and aligning electronic devices for wireless transmission of battery power, including during collective transport of said electronic devices, said kit comprising:
    a portable power charger comprising:
        a charger housing internally storing a rechargeable battery;
        a wireless transmitter disposed within the charger housing and operatively connected to the rechargeable battery capable of wirelessly transmitting a power to an electronic device, said wireless transmitter defining a wireless transmission area; and at least one magnet positioned on or near an outer surface of the charger housing at a predetermined location relative to the wireless transmission area; and an electronic device comprising:
an electronic device housing internally storing a rechargeable battery;
a wireless receiver disposed within the electronic device housing and operatively connected to the rechargeable battery capable of receiving the power and directing it to the rechargeable battery, said wireless receiver defining a wireless reception area; and
a number of magnets complementing the number of magnets on the charger housing, said magnets being positioned on or near an outer surface of the electronic device at a predetermined location relative to the wireless reception area, whereas when the electronic device is connected to the portable charger via interaction of the respective magnets, the wireless receiver of the electronic device is aligned with the transmitter of the portable charger for wireless exchange of the power from the transmitter to the receiver and said portable charger maintains magnetic and wireless connection with the electronic device during collective transport of the portable charger and the electronic device.

13. The wireless charging kit according to claim 12, wherein the at least one magnet on the charger housing comprises a plurality of magnets geometrically arranged on or near the outer surface of the charger housing in spaced apart relationship to one another; and
wherein the electronic device includes a complementary number of magnets arranged in the same geometrical arrangement and space apart relationship as for the plurality of magnets on the portable charger.

14. A portable power charger for recharging an electronic device having a rechargeable internal battery and a wireless receiver, including during collective transport of the portable power charger and said electronic device, said portable power charger unit comprising:
a charger housing internally storing a rechargeable battery;
a wireless transmitter operatively connected to the rechargeable battery capable of wireless transmitting a power to an electronic device attached thereto, said wireless transmitter defining a wireless transmission area; and
a magnet positioned on or near an outer surface of the charger housing at a predetermined location relative to the wireless transmission area and being adapted for interaction with an electronic device having at least one of a magnet and a metallic piece so positioned on the electronic device such that when said electronic device is attached to the portable charger via the magnet in the portable charger and the magnet or metallic piece in the electronic device, the wireless receiver in said electronic device is aligned with the wireless transmitter in the portable charger, and
wherein said portable charger maintains magnetic and wireless connection with the electronic device during collective transport of the portable charge and the electronic device.

15. The portable power charger according to claim 14, wherein the magnet on the charger housing comprises a plurality of magnets geometrically arranged on or near the outer surface of the charger housing in spaced apart relationship to one another.

16. The portable power charger according to claim 15, wherein the geometrical arrangement of magnets on the portable charger defines a central space generally aligned with the wireless transmission area so that the magnets do not interfere with transmission from the wireless transmitter.

17. The portable power charger according to claim 15, wherein the plurality of magnets comprises four magnets generally arranged to define a square.

18. The portable power charger according to claim 15, wherein the plurality of magnets comprises three magnets generally arranged to define a triangle.

19. The portable power charger according to claim 14, further comprising at least one power connection interface operatively connected to the rechargeable battery capable of operating as at least one of a power input and a power output, wherein when said at least one power connection interface acts as a power input, an electrical charge current is provided from an external power source to the portable power charger for recharging the rechargeable battery when the portable power charger is connected to said external power source via said at least one power connection interface, and wherein when the said at least one power connection interface acts as a power output, a charge is provided from the rechargeable battery of the portable power charger to an electronic device to recharge the rechargeable battery of said electronic device when said electronic device is connected to the portable power charger via said at least one power connection interface.

20. The portable power charger according to claim 19, wherein said at least one power connection interface comprises at least one of a power connection port and a power connection cable operatively connected to the rechargeable battery.

* * * * *